US011416787B2

(12) United States Patent
Bailey et al.

(10) Patent No.: US 11,416,787 B2
(45) Date of Patent: Aug. 16, 2022

(54) PARALLEL PROCESSING FOR SOLUTION SPACE PARTITIONS

(71) Applicant: Cox Automotive, Inc., Atlanta, GA (US)

(72) Inventors: Thomas Glenn Bailey, Alpharetta, GA (US); Bruce William Colletti, Alexandria, VA (US); Eric Charles Wait, Ardmore, PA (US); Alexander Coleman King, Atlanta, GA (US); Bhavin Ashitkumar Gandhi, Cambridge, MA (US)

(73) Assignee: Cox Automotive, Inc., Atlanta, GA (US)

( * ) Notice: Subject to any disclaimer, the term of this patent is extended or adjusted under 35 U.S.C. 154(b) by 224 days.

(21) Appl. No.: 16/441,512

(22) Filed: Jun. 14, 2019

(65) Prior Publication Data

US 2019/0295009 A1 Sep. 26, 2019

Related U.S. Application Data

(62) Division of application No. 15/154,392, filed on May 13, 2016.

(Continued)

(51) Int. Cl.
*G06Q 10/04* (2012.01)
*G06N 5/00* (2006.01)
*G06Q 10/08* (2012.01)

(52) U.S. Cl.
CPC ........... *G06Q 10/047* (2013.01); *G06N 5/003* (2013.01); *G06Q 10/083* (2013.01)

(58) Field of Classification Search
CPC ..... G06Q 10/047; G06Q 10/083; G06N 5/003
(Continued)

(56) References Cited

U.S. PATENT DOCUMENTS 5,122,959 A 6/1992 Nathanson et al.
2002/0143646 A1 10/2002 Boyden et al.
(Continued)

FOREIGN PATENT DOCUMENTS

CN 102378961 A 3/2012
CN 102798394 A 11/2012
(Continued)

OTHER PUBLICATIONS

"GPU Computing for Parallel Local Search Metaheuristics" to Luong et al., Nov. 7, 2011 (Year: 2011).*
(Continued)

*Primary Examiner* — Charles Guiliano
*Assistant Examiner* — Po Han Lee
(74) *Attorney, Agent, or Firm* — Eversheds Sutherland (US) LLP

(57) ABSTRACT

Systems, devices, methods, and computer-readable media are disclosed for utilizing group theoretic techniques to enable data exchange between a supervisory central processing unit (CPU) and a group of graphical processing units (GPUs). The CPU may be configured to utilize a tabu search metaheuristic to explore a solution space to determine an optimal solution to an optimization problem. More specifically, the CPU may determine a fragmentation of a solution space that yields multiple partitions of the solution space and may assign each partition to a respective GPU configured to calculate a computational result. The CPU may then determine a new fragmentation of the solution space based on the computational results received from the GPUs that yields new partitions of the solution space and may assign each new partition to a respective GPU configured to again generate a computational result based on its assigned new partition. The CPU may continue to determine new fragmentations based on the computational results of the GPUs (Continued)

until stopping criteria are satisfied and a timely, high-quality solution to the optimization problem is determined.

17 Claims, 10 Drawing Sheets

Related U.S. Application Data

(60) Provisional application No. 62/237,425, filed on Oct. 5, 2015, provisional application No. 62/162,069, filed on May 15, 2015.

(58) Field of Classification Search
USPC .......................................................... 705/7.13
See application file for complete search history.

(56) References Cited

U.S. PATENT DOCUMENTS

| | | |
|---|---|---|
| 2005/0222827 A1 | 10/2005 | Emek et al. |
| 2005/0288986 A1 | 12/2005 | Barts et al. |
| 2006/0020564 A1 | 1/2006 | Zheng |
| 2007/0038506 A1* | 2/2007 | Noble .................... G06Q 10/08 705/13 |
| 2007/0087756 A1 | 4/2007 | Hoffberg |
| 2008/0021756 A1 | 1/2008 | Kesavan |
| 2008/0077464 A1 | 3/2008 | Gottlieb et al. |
| 2008/0312885 A1 | 12/2008 | Chu et al. |
| 2010/0257538 A1 | 10/2010 | Zhao et al. |
| 2011/0137830 A1 | 6/2011 | Ozyurt et al. |
| 2014/0149331 A1 | 5/2014 | Iorio |
| 2014/0214373 A1 | 7/2014 | Jardin et al. |
| 2014/0344199 A1 | 11/2014 | Cantin |
| 2015/0039365 A1 | 2/2015 | Haque |
| 2015/0286611 A1 | 10/2015 | Moll et al. |
| 2015/0379075 A1 | 12/2015 | Hara et al. |
| 2017/0046658 A1 | 2/2017 | Jones et al. |
| 2017/0255872 A1 | 9/2017 | Hamze |

FOREIGN PATENT DOCUMENTS

| | | |
|---|---|---|
| CN | 103617088 A | 3/2014 |
| CN | 104123178 A | 10/2014 |
| WO | 2011002451 A1 | 1/2011 |
| WO | 2015040282 A1 | 3/2015 |

OTHER PUBLICATIONS

"Cellular GPU Models to Euclidean Optimization Problems : Applications from Stereo Matching to Structured Adaptive Meshing and Traveling Salesman Problem" to Zhang., Apr. 23, 2014 (Year: 2014).*
"Solving the Theater Distribution Vehicle Routing and Scheduling Problem using Group Theoretic Tabu Search" to Crino et al., Jul. 20, 2004 (Year: 2004).*
"GPU and Heterogeneous Computing in Discrete Optimization" to Brodtkorb et al., Jun. 25, 2014 (Year: 2014).*
"The Floyd-Warshall Algorithm and the Asymmetric TSP " to Kleiman, Oct. 15, 2004 (Year: 2004).*
Navarro et al., "A Survey on Parallel Computing and its Applications in Data-Parallel Problems Using GPU Architectures", Communications in Computational Physics, 2013, 15, (2), pp. 285-329.
Anonymous: "General-purpose computing on graphics processing units—Wikipedia", May 3, 2015, XP055509534, Retrieved from the Internet: URL:https://en.wikipedia.org/w/index.php?title=General-purpose_computing_on_graphics_processing_units&oldid=660605616 [retrieved on Apr. 15, 2018].
Anonymous: "Motherboard—Wikipedia", May 12, 2015, XP055509540, Retrieved from the Internet: URL: https://en.wikipedia.org/w/index.php? title=Motherboard&oldid=662045502 [retrieved on Apr. 15, 2018].
Search Report for European Application No. 16797032.6 dated Apr. 10, 2018.
International Search Report and Written Opinion for PCT/US2016/055551, dated Jan. 19, 2017.
International Search Report and Written Opinion for PCT/US2016/032463, dated Aug. 22, 2016.
Supplementary European Search Report for Application No. EP 16854238, dated Feb. 6, 2019 (1 page).
Chinese Office Action and Search Report for Application No. CN 2016800711227, dated Sep. 18, 2020. (8 pages). [English translation of Office Action is included herewith).
He Yi, "Research on Taboo Search and Its Parallelization", Southwest University, Master Degree Thesis, April 1, [81 J006. (133 pages).
C. Rego, et al., "Metaheuristic Optimization Via Memory and Evolution: Tabu Search and Scatter Search", Springer Science & Business Media, Mar. 30, 2006. (471 pages).
First Examination Report for Australian Application No. 2016333979, dated Mar. 1, 2021. (7 pages).
Tang, et al., "Solution Method for the Location Planning Problem of Logistics Park with Variable Capacity", Computers & Operations Research, vol. 40, No. 1, Jan. 1, 2013, pp. 406-417. (12 pages).
Chinese Office Action and Search Report for Application No. CN 201680029888.9, dated Oct. 30, 2020. (17 pages). [English translation of Office Action is included herewith).
Chinese Office Action and Search Report for Application No. CN 201680029888.9, dated May 18, 2021. (19 pages). [English translation of Office Action is included herewith).
Janiak et al. "Tabu Search on GPU", Journal of Universal Computer Science, 2009: 14 (14), pp. 2416-2427.
Bozejko et al. "Flexible Job Shop Problem—Parallel Tabu Search Algorithm for Multi-GPU", Archives of Control Sciences, 2012: 22 (4), pp. 389-397.
Novoa et al. "A SIMD Tabu Search Implementation for Solving the Quadratic Assignment Problem with GPU Acceleration", XSEDE '15: Proceedings of the 2015 XSEDE Conference: Scientific Advancements Enabled by Enhanced Cyberinfrastructure, 2015, 13, pp. 1-8.
Luong et al. "Parallel Local Search on GPU", Institut National De Recherche En Informatique Et En Automatique, 2009, pp. 1-25.
Burks et al. "An Adaptive Tabu Search Heuristic for the Location Routing Pickup and Delivery Problem with Time Windows with a Theater Distribution Application.", Aug. 2006.

* cited by examiner

PARALLEL PROCESSING FOR SOLUTION SPACE PARTITIONS

CROSS-REFERENCE TO RELATED APPLICATIONS

This application claims priority to, the benefit of, and is a divisional application of U.S. application Ser. No. 15/154,392, filed May 13, 2016, which claims priority to U.S. Provisional Application No. 62/162,069, filed May 15, 2015, and U.S. Provisional Application No. 62/237,425, filed Oct. 5, 2015, which are all hereby incorporated by reference herein in their entirety.

BACKGROUND

Solving an optimization problem involves finding an optimal solution from a set of candidate solutions. Optimization problems include minimization problems in which the optimal solution is a solution that minimizes an objective function subject to one or more constraints or maximization problems in which the optimal solution is a solution that maximizes an objective function subject to one or more constraints. Optimization problems may involve discrete variables and/or continuous variables. An example of an optimization problem involving discrete variables is a combinatorial optimization problem for which an optimal solution may be a discrete element (e.g., an integer, permutation, graph, etc.) from a finite (or possibly countable infinite) set. An optimal solution to an optimization problem that involves continuous variables may include a sequence of values for each of the continuous variables.

BRIEF DESCRIPTION OF DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
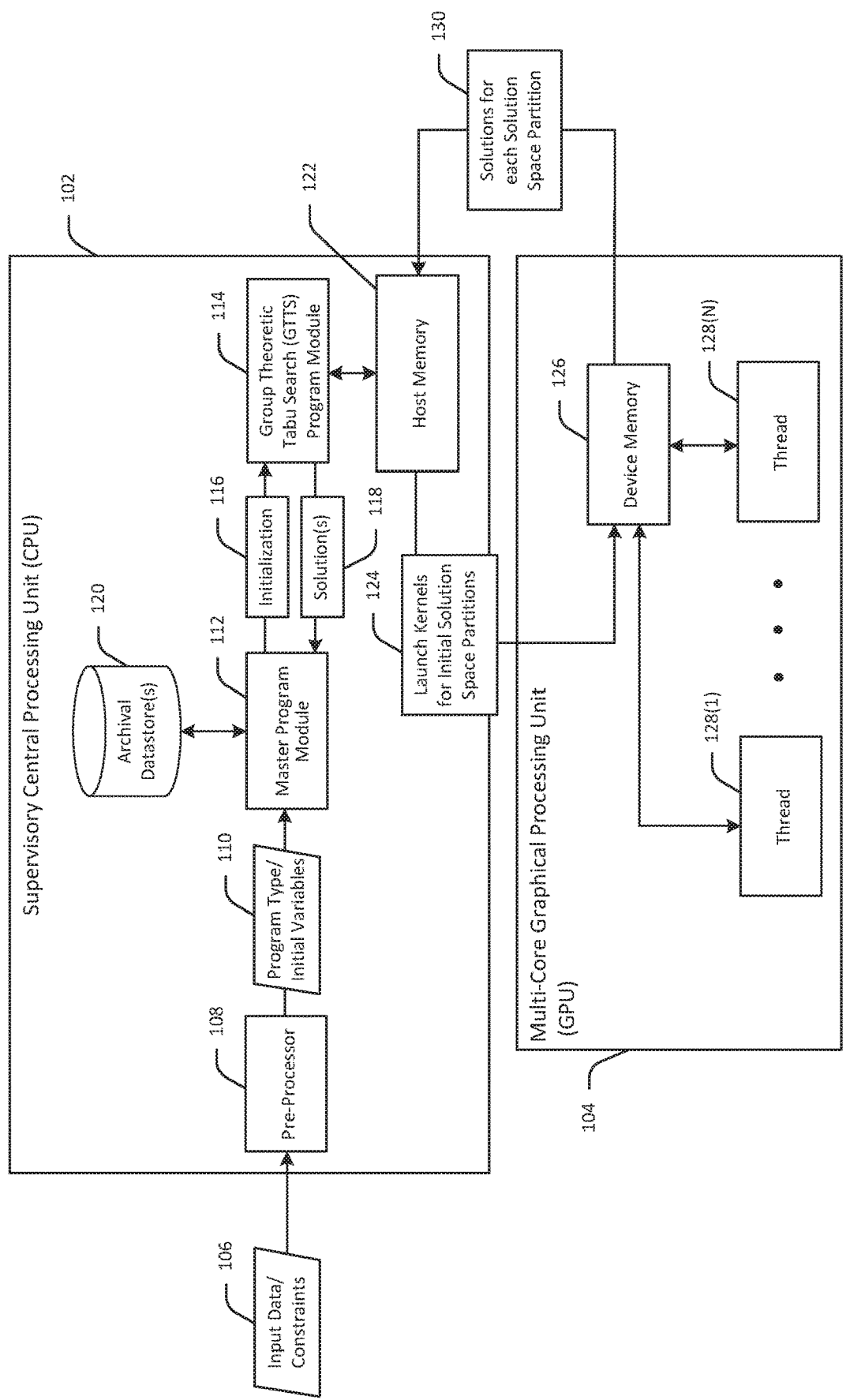
FIG. 1 depicts an example system architecture including a supervisory central processing unit (CPU) and a multi-core graphical processing unit (GPU) containing multiple GPU threads, where each GPU thread is configured to process a respective fragmented portion of a solution space in accordance with one or more example embodiments of the disclosure.

This disclosure relates to, among other things, systems, devices, methods, and computer-readable media for utilizing group theoretic techniques to enable data exchange between a supervisory central processing unit (CPU) and a collection of graphical processing units (GPUs). In certain example embodiments, the CPU may be configured to utilize a tabu search metaheuristic to explore a solution space to determine a timely, high-quality solution to an optimization problem. More specifically, the CPU may determine a fragmentation of a solution space that yields multiple fragments (also referred to herein as partitions) and may assign each partition to a respective GPU thread configured to calculate a computational result. The CPU may then determine a new fragmentation of the solution space based on the computational results received from the GPU threads that yields new partitions of the solution space and may assign each new partition to a respective GPU thread configured to again generate a computational result based on its assigned new partition. The CPU may continue to determine new fragmentations based on the computational results of the GPU threads until stopping criteria are satisfied and a timely, high-quality solution to the optimization problem is determined. In certain example embodiments, the stopping criteria may be a threshold number of iterations (e.g., a threshold number of new fragmentations) during which an improved solution to the optimization problem is not found.

The timely, high-quality solution to the optimization problem may then be the best solution determined up until the stopping criteria are satisfied. The best solution may be the solution that most optimizes (e.g., most minimizes or most maximizes one or more variables) among all solutions determined up until the stopping criteria are satisfied.

Particular embodiments of the subject matter described herein can be implemented so as to realize one or more of the following improvements. Provide accurate and efficient methods for optimizing delivery routes utilizing parallel processing of one or more specialized processing units. In turn, this increases the speed of optimization and reduces the computational stress on servers and components responsible for the optimizations. Ensure faster deliveries and in turn improves the user experience; and reduces the cost associated with deliveries and may increase revenue.

An example optimization problem capable of being solved using, for example, GTTS processing in accordance with example embodiments of the disclosure may be an n-city, m-Traveling Salesman Problem (TSP). A timely, high-quality solution to an n-city, m-TSP optimization problem may be one that identifies the most profitable routes (e.g., lowest total distance traveled) for a fleet of agents to travel to pick up and drop off items (e.g., vehicles) during specified time windows. More specifically, in an n-city, m-TSP optimization problem, m agents may be required to visit n locations (e.g., cities) to pickup/deliver vehicles. Vehicle pickups and deliveries may occur during specified time windows, with each city being visited once by only one agent, and each agent having its assigned collection of cities. In addition, each agent may be required to return to the city from which it initially started its route. A solution to the n-city, m-TSP optimization problem may identify which cities (and in what order) are visited by which agents.

For n cities and directed distance $d_{ij}$ from City i to City j, intercity distances may be represented in a 0-diagonal n×n matrix D of non-negative real numbers. Although D is typically symmetric, D may also be asymmetric, in which case, the directed distance $d_{ij}$ from City i to City j may differ from the directed distance $d_{ji}$ from City j to City I for one or more pairs of cities i,j. Each agent may be associated with a subtour which may represent the order in which the agent visits its assigned cities. The subtours for all agents may collectively comprise a tour. The set of all tours may be represented as the elements of $S_n$, the symmetric group on n symbols. Each element represents a bijective function from the set of n symbols onto itself, and the group operation (permutation multiplication) is function composition. The subtours of a tour may be the disjoint cyclic factors (DCFs) of the permutation that represents the tour.

For example, if two agents visit cities 1 through 7, then the tour represented by the permutation p=(1, 5) (2, 6, 3, 7, 4)∈$S_7$ includes subtours represented by the disjoint cyclic factors (1, 5) and (2, 6, 3, 7, 4). In this example, a first agent may visit cities 1 and 5, while a second agent may visit the remaining cities, with each agent returning to the city from which it started. Further, a cycle's tourlength may be the sum of each of its arclengths, and a tour's length may be the sum of the tourlengths of the subtours that comprise the tour. For example, for the tour represented by the permutation p=(1, 5) (2, 6, 3, 7, 4), the tour's length may be the sum of the tourlength of the subtour represented by the DCF (1, 5) and the tourlength of the subtour represented by the DCF (2, 6, 3, 7, 4). The tourlength of the subtour represented by the DCF (1, 5) may be the sum of the arclengths between city 1 and city 5 (e.g., the directed distance from city 1 to city 5) and between city 5 and city 1. Further, the tourlength of the subtour represented by the DCF (2, 6, 3, 7, 4) may be the sum of the arclengths 2→6); (6→3); (3→7); (7→4); and (4→2).

In certain example embodiments, group theoretic approaches may be used to generalize the n-city, 1-TSP problem using the equation p*W, where p=the permutation composition of k cyclized subpaths (e.g., the DCFs of p) and W=set of full cycles on T U complement (mov(p)), where T is the set of subpath tails of p, * is permutation composition, and mov(p) is the set of symbols in the DCFs of p. The use of the above-described equation p*W for solving a n-city, 1-TSP optimization problem allows diverse tours to be created that preserve properties associated with desirable solutions.

More generally, an optimization problem such as the n-city, m-TSP problem may be represented as a mathematical program (MP). An MP is a system of equations in which one or more objective functions are optimized over a region defined by one or more constraint equations. Various types of methods may be used to solve an MP. Exact methods are designed to determine global optima to an MP. Exact methods, however, may fail to determine global optima within a time constraint associated with application of the MP. Heuristic methods may also be used to solve an MP. Heuristic methods utilize deterministic and probabilistic methods (e.g., quasi-random number generation) to attempt to obtain a high-quality solution to an MP within a time constraint. Heuristic methods, however, may fail to obtain such a high-quality solution since they utilize empirical results that cannot guarantee high-quality solutions. Yet another example of a type of method that may be used to solve an MP is a metaheuristic method. A metaheuristic method utilizes heuristics to manage the use of heuristics. Tabu search, neural networks, and genetic algorithms are examples of metaheuristic methods. Group theory is a branch of mathematics directed to the properties of groups, a type of algebraic structure. Example embodiments of the disclosure utilize group theoretic techniques to implement tabu search using multiple GPU threads configured to perform, for example, GTTS processing on respective partitions of a solution space in parallel. In one implementation, GTTS processing may be used by GPUs to search their respective assigned solution space portions. However, other suitable processing methodology may also be used, either alone or in combination with GTTS. In one example, simulated annealing may be used by GPUs to search their respective assigned solution space portions. Similarly, a genetic algorithm may be used by GPUs to search their respective assigned solution space portions. It should be understood that the above search and processing methodologies are example processing methodologies and are not to be construed as limiting.

An MP may take on various forms. For example, a linear program (LP) expressed in matrix form optimizes $c^T x$ for Ax=b and x≥0, where b, c and x are column matrices and A is an n-row rectangular matrix A having rank n. All matrix entries are real numbers and all entries are known constants except for those of x. A network program is an LP whose A-matrix is totally unimodular. A goal program is an LP with multiple linear objective functions. A goal program minimizes the summed absolute differences of each objective function from its user-specified target value.

An integer program is an LP as defined above with the additional constraint that x is an integer vector. When suitable constraints are added, an integer program can be solved as an LP. The group minimization problem converts an integer program into a 1-constraint MP whose variables are clock group elements. This transformation arises when the Smith Normal Form of the optimal basis matrix (of the relaxed LP model) has a lone nonzero element greater than 1. A mixed integer program is an LP having continuous and integer variables. A nonlinear program is an MP that has a nonlinear objective function or constraint. A convex program is an MP whose feasible region is a convex set. Each of the above-described MPs includes no random variable. A stochastic program, on the other hand, is an MP that includes random variables. A dynamic program is a multistage MP (with or without random variables) that lacks a structured form. Each stage of a multistage MP is in one of a finite number of states, and the current state affects the choice of the next stage's state. Given the current state, an optimal policy for the remaining stages is unaffected by earlier choices.

Optimization problems capable of being solved using, for example, GTTS processing in accordance with example embodiments of the disclosure include, for example, MPs that include continuous variables, MPs that include discrete variables, and MPs that include discrete and continuous variables (also referred to as mixed MPs). Examples of such MPs include integer and linear programs. More specifically, example embodiments of the disclosure may utilize GTTS processing to solve MPs having the following form: optimize $g_1(x), \ldots, g_n(x)$ for $x \in S \subseteq \Omega$, where S (the feasible region) is a subset of set $\Omega$ (the universe). In turn, the set difference $\Omega-S$ is the infeasible region. S may be a set of variables (discrete, continuous, or mixed), and, in certain example embodiments, may be a Cartesian product of other sets, in which case, x may be multivariate. Solving such an optimization problem involves either determining any optimum x or determining all such optima. For instance, an integer program may have a relatively small collection of optima whereas a linear program's optimal solution space may be the convex combination of all optimal vertices on the polyhedron S. The $g_k$ are the objective functions whose manner of optimization is user-defined, e.g., find all joint optima x; optimize $g_{k+1}$ over the optima obtained for $g_k$; or minimize the summed absolute differences of each objective function from its user-specified target value. Optima may be obtained via exact methods if capable of being achieved within a time constraint. Alternatively, heuristics may be used that, in turn, may apply exact methods to tractable smaller problems.

Example System Operation and Processing

FIG. 1 depicts an example system architecture including a supervisory central processing unit (CPU) 102 and a multi-core graphical processing unit (GPU) 104 containing multiple GPU threads, where each GPU thread is configured to process a respective fragmented portion of a solution space in accordance with one or more example embodiments of the disclosure. It should be appreciated that FIG. 1 depicts an example configuration of the supervisory CPU 102 and the multi-core GPU 104 and that other configurations including additional and/or alternative hardware, firmware, and/or software components are also within the scope of this disclosure.

The supervisory CPU 102 may include a pre-processor 108 configured to receive input data and constraints 106 as input. The input data 106 may include data relating to an optimization problem to be solved such as, for example, the n-city, m-TSP problem. For example, the input data may indicate a number of cities, inter-city distances between each pair of cities, and a number of agents designated to travel between the cities. In the case of the n-city, m-TSP problem, the constraints 106 may include an identification of which cities much be visited by a specific agent, an order in which cities must be visited, and so forth.

The pre-processor 108 may be configured to select an appropriate MP for representing the optimization problem based at least in part on the input data/constraints 106. For example, the pre-processor 108 may choose a particular type of MP to represent the optimization problem among candidate types of MPs. The candidate types of MPs may include a linear program, an integer program, a mixed integer program, a nonlinear program, a convex program, a stochastic program, a dynamic program, or the like. For example, the pre-processor 108 may select an integer program to represent the n-city, m-TSP problem.

Upon selection of a type of MP to represent the optimization program to be solved, the pre-processor 108 may communicate an identification of the selected type of MP to a master program module 112. The pre-processor 108 may further communicate a set of initial variables to the master program module 112. The master program module 112 may be configured to determine a solution method to use to solve the selected type of program. For example, the master program module 112 may determine whether to utilize an exact method or a tabu search method to solve the selected type of MP. Example embodiments of the disclosure in which the optimization problem to be solved is the n-city, m-TSP optimization problem assume that the master program module 112 selects a tabu search method to solve the optimization problem. Accordingly, in such example embodiments, the master program module 112 may initialize a GTTS program module 114 to perform GTTS processing to determine one or more solutions to the problem represented by the selected type of MP from within a solution space and within a specified time constraint. A most elite solution (e.g., a solution that most minimizes or maximizes the one or more objective functions of the optimization problem among the determined solutions) may be a globally optimal solution but may not be confirmable as such.

The GTTS module 114 may determine an initial solution to the selected type of MP that is representative of the optimization problem to be solved. In certain example embodiments, the initial solution may be an elite solution that satisfies stopping/halting criteria for halting the GTTS processing. For example, in the case of the n-city, m-TSP optimization problem, the initial solution may be a permutation representative of a tour between the n cities, where the permutation contains one or more DCFs, each DCF being representative of a subtour between a disjoint subset of the n cities. In other example embodiments, the initial solution may not be an elite solution that satisfies the halting criteria, in which case, the GTTS module 114 may determine an initial fragmentation of the solution space. The GTTS module 114 may be operatively coupled to a host memory 122. The GTTS module 114 may launch 124 a respective kernel corresponding to each solution space partition generated as a result of the fragmentation of the solution space. The kernels may be launched by the CPU 102 on a device memory 126 of the multi-core GPU 104. Each kernel may be associated with a corresponding GPU thread in a collection of GPU threads 128(1)-128(N) contained in the multi-core GPU 104. More specifically, each kernel may manage the processing of a corresponding solution space fragment that is performed by a corresponding GPU thread of the collection of GPU threads 128(1)-128(N).

Each GPU thread may generate one or more computational results (e.g., one or more elite solutions) as a result of processing performed on a corresponding solution space fragment. The device memory 126 may then provide the computational results 130 from the GPU threads 128(1)-128(N) to the host memory 122. The GTTS module 114 may then determine an updated fragmentation of the solution space based at least in part on the computational results 130. The host memory 122 may then communicate the new solution space partitions obtained from the new fragmentation to the device memory 126, which may in turn, assign a respective new solution space partition to each GPU thread in the collection of GPU threads 128(1)-128(N). Each GPU thread may explore its corresponding new solution space partition and generate one or more computational results (e.g., one or more elite solutions), which may be provided by the device memory 126 to the host memory 122. The GTTS module 114 may determine additional fragmentations of the solution space, which may be processed in parallel iteratively by the collection of GPU threads 128(1)-128(N) until halting criteria are satisfied and an elite solution is chosen as a timely, high-quality solution to the optimization problem. In certain example embodiments, the halting criteria may be a time constraint associated with the optimization problem. For example, after a predetermined time period has elapsed, a most optimal elite solution obtained to that point may be selected as a final solution to the optimization problem. In other example embodiments, the halting criteria may be additionally or alternatively defined by a threshold number of iterations of the GTTS processing (e.g., a threshold number of fragmentations of the solution space).

In certain example embodiments, at least a portion 118 of the computational results generated by the collection of GPU threads 128(1)-128(N) may be communicated by the GTTS module 114 to the master program module 112. The master program module 112 may store the computational results 118 in one or more archival datastore(s) 120. The computational results 118 stored in the datastore(s) 120 may be used to determine an elite solution to select as a new initial solution for the GTTS processing when GTTS processing performed on a previously selected initial solution fails to generate any additional elite solution(s). In addition, the computational results 118 stored in the datastore(s) 120 may be used to ensure that GTTS processing performed with respect to a current elite solution does not cycle back to an existing elite solution that has already been processed.

Referring in more detail to the fragmentation performed by the GTTS program module 114, the fragmentation may split the solution space $\Omega$ (e.g., the group of all permutations of a set M which, in turn, is the symmetric group of the set M) into disjoint subsets referred to herein as cells. The GTTS processing performed by the collection of GPU threads 128(1)-128(N) may not be able to fully explore any given cell since the cell size (e.g., the number of permutations in the disjoint subset corresponding to the cell) may be large. In certain example embodiments, an initial solution to the optimization problem may be chosen and the GTTS processing may be initiated in the cell that contains the initial solution. When the GTTS processing fails to identify any new elite solution within the current cell, the GTTS processing may continue by diversifying the exploration of the solution space and continuing processing in another cell. As such, cells may also be referred to herein as diversification cells.

As previously described, an initial solution may determine the initial fragmentation of $\Omega$. That is, negative entries in the matrix $^PD$ (described in more detail hereinafter) may identify the arcs among which is one that yields a better solution than the initial solution. This use of $^PD$ may be expanded into one that fragments $\Omega$. More specifically, selected negative arcs corresponding to negative entries in the matrix $^PD$ may be used to form cycles that generate a proper subgroup H of $\Omega$. In turn, the group action $H^\Omega$ may split $\Omega$ into orbits that represent the diversification cells.

The GTTS processing may include a mechanism for ensuring that previously explored elite solutions are not explored again. In particular, the GTTS processing may visit the orbits by utilizing a cross-cutting transversal T (also referred to herein as a diversification transversal). The elements of the diversification transversal may index the orbits (the diversification cells) and when T is suitably small, may store data indicating that the orbits have been visited. This may ensure anti-cycling and may avoid hash structures. Although transversal size and orbital sizes move in opposite directions, a transversal may be constructed without having to construct an orbit. As a result, the group action may be chosen to produce a suitably short transversal. For example, a lesser number of negative entries may be chosen from $^PD$ to reduce the number of diversification cells that are constructed, thereby reducing the transversal size.

In certain example embodiments, assigning the exploration of each diversification cell to a different GPU thread may not be feasible within a time constraint associated with an optimization problem since exploration of a diversification cell may be demanding. Rather, the GPU threads may be used to explore a single diversification cell, with the GTTS module 114 managing movement along the diversification transversal. Exploration of a single diversification cell may include a short term memory (STM) phase and an intensification phase of tabu search. The STM phase may include exploration of a diversification cell to determine elite solution(s). When an STM phase fails to produce any additional elite solution, the GTTS processing may return to the most elite solution determined thus far and may initiate an intensification phase in connection with the most elite solution. For example, the GTTS processing may initiate a new STM phase in connection with the most elite solution. When that new STM phase fails to produce any additional elite solution, the GTTS processing may again initiate the process at the most elite solution. If that most elite solution is the same as a previously chosen elite solution, the GTTS processing may instead continue with the next best elite solution. Alternatively, the GTTS processing may initiate multiple new STM phases in parallel from respective multiple elite solutions.

The majority of the processing load on the GPU threads may occur during the STM phases of the GTTS processing. Since each GPU thread may explore the same diversification cell $\Lambda$, the cell $\Lambda$ may be split into smaller sub-cells that are each probed in a parallel search by a corresponding GPU thread. A respective initial solution may be chosen for each sub-cell to launch the GTTS processing with respect to each sub-cell. Although any equivalence relation on $\Lambda$ may result in a fragmentation of $\Lambda$, certain fragmentations may be more likely to yield elite solutions and/or may be easier to process than others. In particular, another group action may be used to construct a transversal that may be used to navigate the smaller sub-cells while avoiding cycling. In turn, each transversal element may launch an STM phase of the GTTS processing that is assigned to a corresponding GPU thread. Since each GPU thread explores a different disjoint orbit, GPU threads may not be required to communicate with one another.

More specifically, since the group action $_H\Omega$ produced the diversification cells, any H-subgroup K yields the group action $_K\Lambda$ having orbits that fragment $\Lambda$. As long as H does not have a prime order, the GTTS module 114 may apply different H-subgroups to each of the diversification cells to achieve different fragmentations, each of which may be more appropriate to the cell's initial solution. In order to achieve this, H may need to have a suitably rich subgroup lattice from which a choice of K can be made. This, however, may, in turn, affect how negative arcs are chosen from $^PD$ to build the diversification cells.

Figure 2:
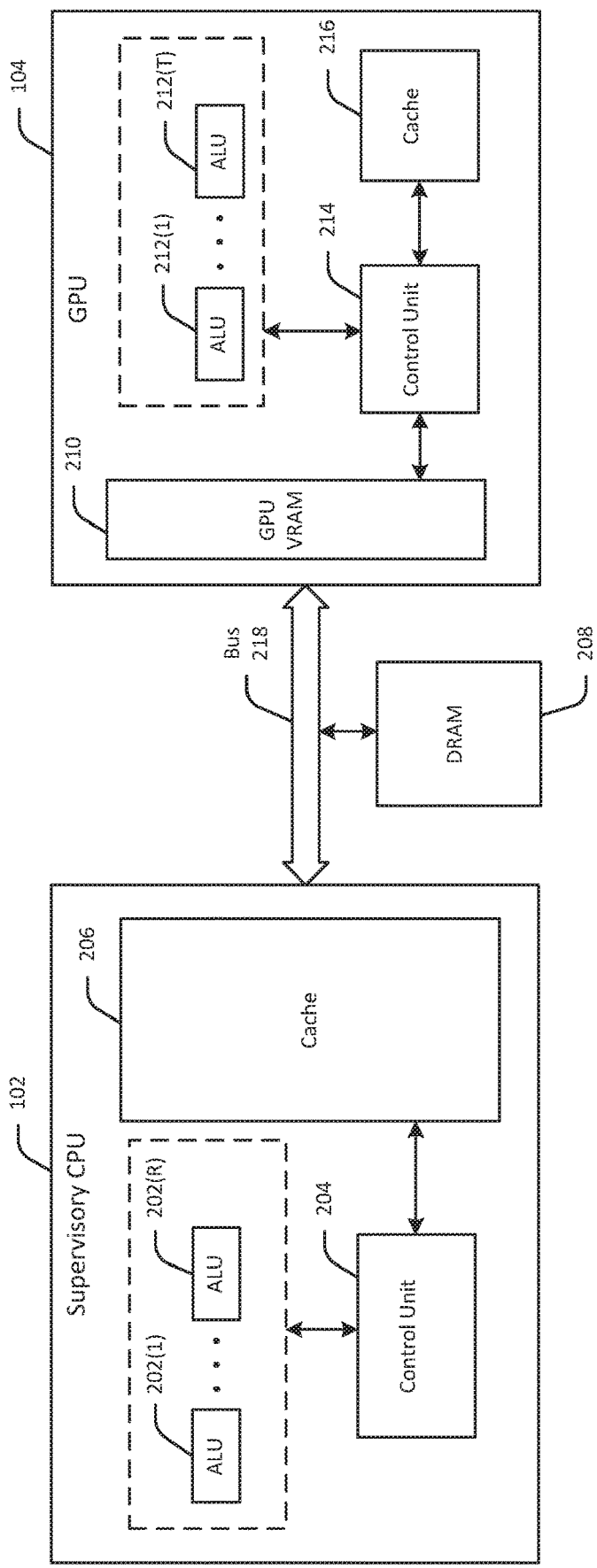
FIG. 2 depicts an example hardware architecture of a supervisory CPU and an example hardware architecture of a GPU in accordance with one or more example embodiments of the disclosure.

FIG. 2 depicts an example hardware architecture of the supervisory CPU 102 and an example hardware architecture of the GPU 104 in accordance with one or more example embodiments of the disclosure. It should be appreciated that other hardware architectures of the CPU 102 and the GPU 104 that may include additional and/or alternative hardware, firmware, and/or software components than the example hardware architectures depicted in FIG. 2 are also within the scope of this disclosure.

The supervisory CPU 102 may include a group of arithmetic logic units (ALUs) 202(1)-202(R). The supervisory CPU 102 may also include a cache 206. The supervisory CPU 102 may be optimized to store and retrieve data from the cache 206 with a low latency. The supervisory CPU 102 may further include a control unit 204 that is operatively coupled to the group of ALUs 202(1)-202(R) and the cache 206. The control unit 204 may be configured to manage the utilization of the various ALUs 202(1)-202(R) as well as manage the storage and retrieval of data in the cache 206.

The supervisory CPU 102 may be operatively coupled to one or more memory devices such as, for example, a dynamic random access memory (DRAM) 208. The CPU 102 may be operatively coupled to the DRAM 208 via one or more buses 218 such as, for example, one or more buses that utilize a Peripheral Component Interconnect (PCI) Express high-speed serial computer expansion bus standard. The one or more buses 218 may further operatively couple the CPU 102 to the GPU 104, allowing data exchange between the CPU 102 and the GPU 104.

The GPU 104 may include a collection of ALUs 212(1)-212(T). In certain example embodiments, the number of ALUs in the collection of ALUs 212(1)-212(T) of the GPU 104 may be greater than the number of ALUs in the collection of ALUs 202(1)-202(R) of the CPU 102, which may allow the GPU 104 to execute a greater number of parallel computations than the CPU 102. In particular, the GPU 104 may be more efficient at launching multiple processing threads and executing the threads in parallel than the CPU 102. The GPU 104 may further include a cache 216, one or more memory devices (e.g., video RAM (VRAM) 210), and a control unit 214 that operatively couples the collection of ALUs 212(1)-212(T), the VRAM 210, and the cache 216. The control unit 214 may be configured to manage the utilization of the various ALUs 202(1)-202(T) as well as manage the storage and retrieval of data in the VRAM 210 and/or the cache 216. The cache 206 of the CPU 102 may be larger than the cache 216 of the GPU 104 to enable the CPU 102 to rapidly switch between execution jobs.

In certain example embodiments, the CPU 102 may serve as a host to the GPU 104, which may act as a coprocessor to the CPU 102. Data from the DRAM 208 may be copied to the VRAM 210 for use by the GPU 104 in performing computations using the collection of ALUs 212(1)-212(T). In particular, the host (e.g., the CPU 102) may launch kernels on the coprocessor (e.g., the GPU 104) and may also determine the number of threads needed to process an execution job in parallel on the GPU 104. After the GPU 104 executes the threads in parallel and completes the execution job, the computational results may be stored in the VRAM 210 and copied from the VRAM 210 to the DRAM 208. The CPU 102 may the access the computational result from the DRAM 208.

Figure 3:
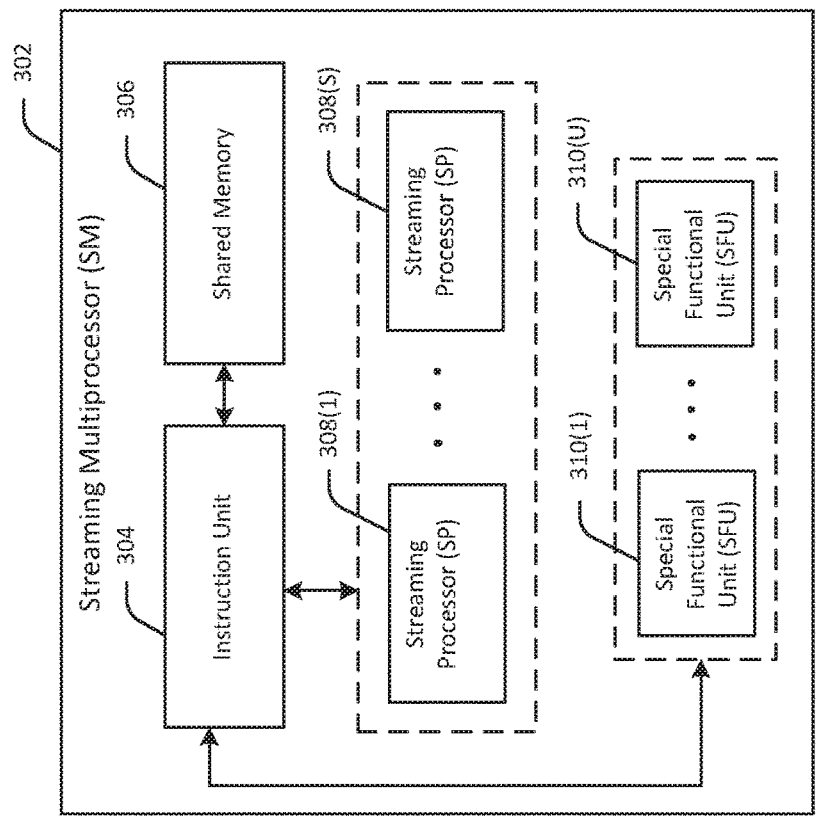
FIG. 3 depicts an example configuration of a streaming multiprocessor of a GPU in accordance with one or more example embodiments of the disclosure.

FIG. 3 depicts an example configuration of a streaming multiprocessor of the GPU 104 in accordance with one or more example embodiments of the disclosure. In certain example embodiments, the streaming multiprocessor depicted in FIG. 3 may be a particular configuration of a GPU thread of the collection of GPU threads 128(1)-128(N) depicted in FIG. 1. It should be appreciated, however, that other configurations of a streaming multiprocessor that may include additional and/or alternative hardware, firmware, and/or software components than the configuration depicted in FIG. 3 are also within the scope of this disclosure.

As depicted in FIG. 3, the streaming multiprocessor (SM) 302 may include an instruction unit 304 operatively coupled to a shared memory 306. The SM 302 may include a group of streaming processors (SPs) 308(1)-308(S) operatively coupled to the instruction unit 304. Each SP 308(1)-308(S) may be referred to herein interchangeably as a core. The instruction unit 304 may distribute a set of instructions among the SPs 308(1)-308(S), with each SP executing a single thread instruction. Each SP 308(1)-308(S) may include a multiply-add arithmetic unit configured to perform single-precision floating-point operations. In addition, the SM 302 may include a group of special functional units (SFUs) 310(1)-310(U) that may be configured to execute more complex arithmetic operations with low cycle latency.

Figure 4:
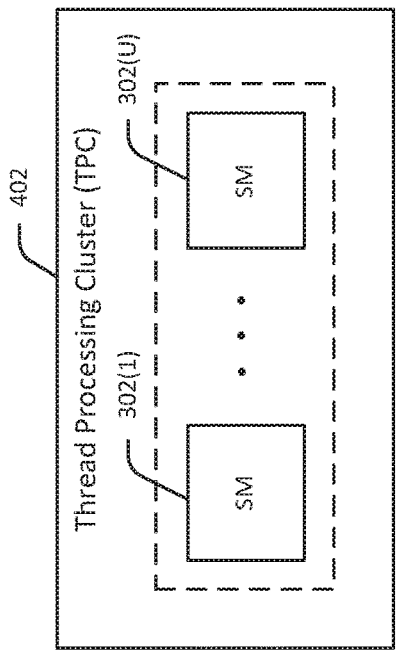
FIG. 4 depicts an example configuration of a thread processing cluster of a GPU in accordance with one or more example embodiments of the disclosure.
Figure 5:
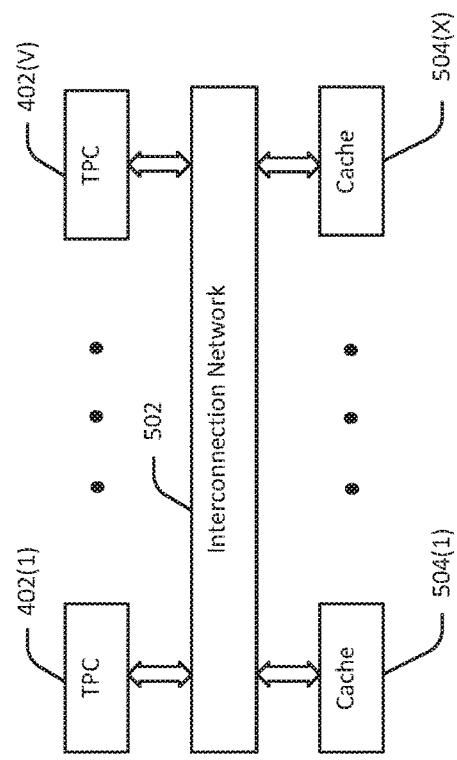
FIG. 5 depicts an example configuration of a GPU in accordance with one or more example embodiments of the disclosure.

FIG. 4 depicts an example configuration of a thread processing cluster (TPC) of the GPU 104 in accordance with one or more example embodiments of the disclosure. It should be appreciated that other configurations of a TPC that may include additional and/or alternative hardware, firmware, and/or software components than the configuration depicted in FIG. 4 are also within the scope of this disclosure. FIG. 5 depicts an example configuration of the GPU 104 in accordance with one or more example embodiments of the disclosure. It should be appreciated that other configurations of the GPU 104 that may include additional and/or alternative hardware, firmware, and/or software components than the configuration depicted in FIG. 5 are also within the scope of this disclosure.

As shown in FIG. 4, a group of SMs 302(1)-302(U) may together comprise at least part of a thread processing cluster (TPC) 402. Any of the SMs 302(1)-302(U) may have the example configuration of the SM 302 depicted in FIG. 3. Further, as depicted in FIG. 5, an example GPU architecture may include a collection of TPCs 402(1)-402(V) operatively coupled to a collection of caches 504(1)-504(X) via an interconnection network 502. Any of the TPCs 402(1)-402 (V) may have the example configuration of the TPC 402. The CPU 102 may allocate thread blocks to the GPU 104, which may, in turn, allocate each thread block to a respective TPC of the collection of TPCs 402(1)-402(V). A respective one or more threads in each thread block may be then be allocated among the various SMs 302(1)-302(U) of the corresponding TPC (e.g., 402(1)) to which the thread block has been allocated.

It should be appreciated that the example hardware architectures and configurations depicted in FIGS. 3-5 are equally applicable to other types of processing units beside the GPU 104. For example, the example hardware architectures and configurations depicted in FIGS. 3-5 are applicable to any multiprocessor/accelerator designed to perform accelerated computation.

Figure 6:
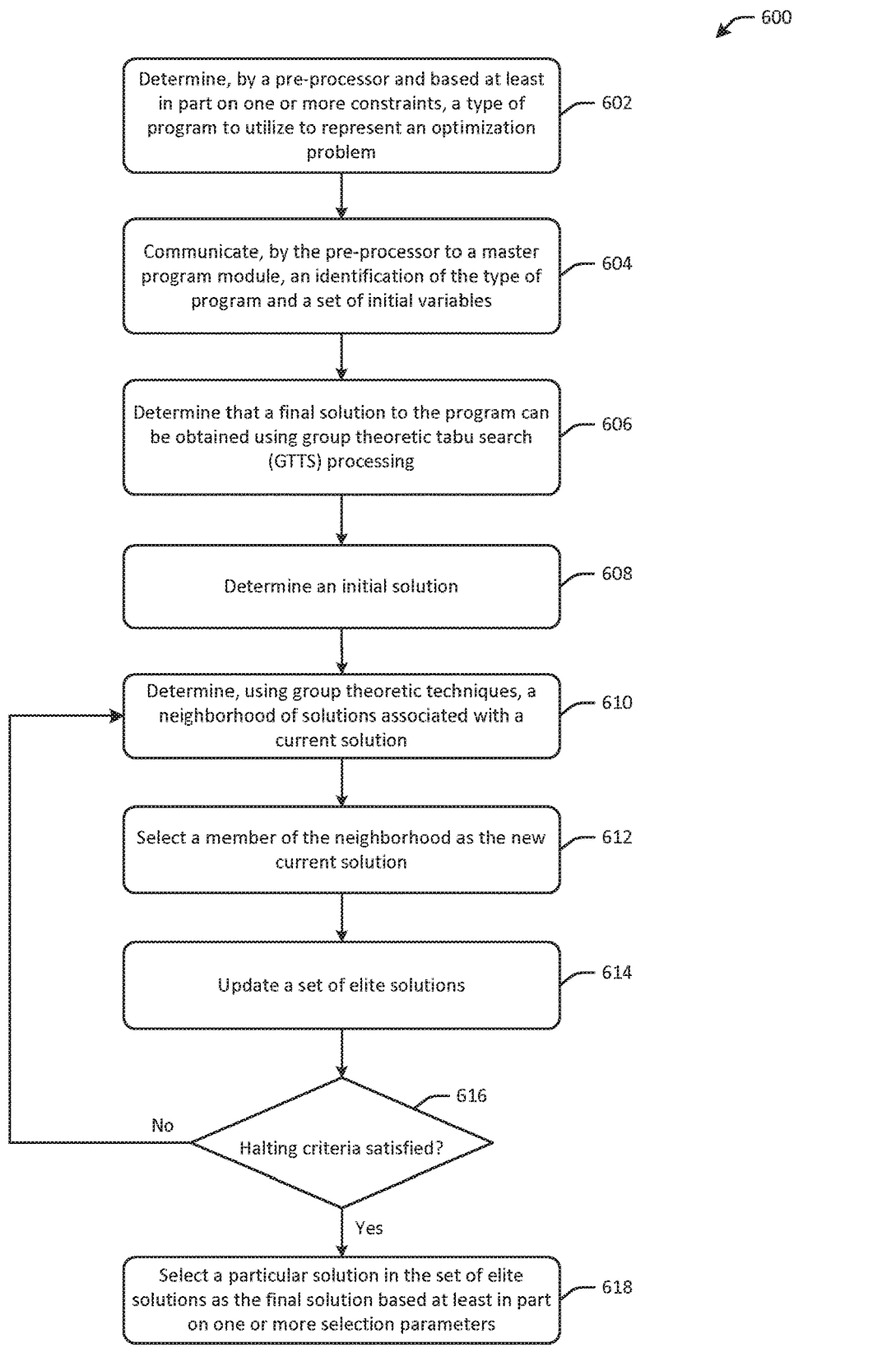
FIG. 6 is a process flow diagram of an illustrative method for executing group theoretic tabu search (GTTS) processing to determine a final solution to a program representative of an optimization problem in accordance with one or more example embodiments of the disclosure.

FIG. 6 is a process flow diagram of an illustrative method 600 for executing group theoretic tabu search (GTTS)

processing to determine a final solution to a program representative of an optimization problem in accordance with one or more example embodiments of the disclosure. FIG. 6 will be described in conjunction with FIG. 1 hereinafter.

At block 602, the pre-processor 108 may determine, based at least in part on one or more constraints, a type of MP to utilize to represent an optimization problem. For example, the pre-processor 108 may determine the type of MP based at least in part on the input data/constraints 106. In particular, the pre-processor 108 may choose a particular type of MP to represent the optimization problem among candidate types of MPs. The candidate types of MPs may include a linear program, an integer program, a mixed integer program, a nonlinear program, a convex program, a stochastic program, a dynamic program, or the like. For example, the pre-processor 108 may select an integer program to represent the n-city, m-TSP problem.

Upon selection of a type of MP to represent the optimization program to be solved, at block 604, the pre-processor 108 may communicate an identification of the selected type of MP to the master program module 112. At block 604, the pre-processor 108 may further communicate a set of initial variables to the master program module 112. The master program module 112 may be configured to determine a solution method to use to solve the selected type of program. For example, at block 606, the master program module 112 may determine that a tabu search method is to be utilized to solve the selected type of MP. More specifically, at block 606, the master program module 112 may determine that a final solution to the program can be obtained using GTTS processing as described herein in accordance with example embodiments of the disclosure.

Example embodiments of the disclosure in which the optimization problem to be solved is the n-city, m-TSP optimization problem assume that the master program module 112 selects a tabu search method to solve the optimization problem. Accordingly, in such example embodiments, the master program module 112 may initialize the GTTS program module 114 to perform GTTS processing to determine one or more elite solutions to the problem represented by the selected type of MP from within a solution space and within a specified time constraint. A most elite solution (e.g., a solution that most minimizes or maximizes the one or more objective functions of the optimization problem) may be selected as a final solution to the optimization problem and may be a globally optimal solution but may not be confirmable as such.

At block 608, the GTTS module 114 may determine an initial solution to the selected type of MP representative of the optimization problem to be solved. More specifically, at block 608, the GTTS module 114 may determine an initial solution as a current solution of the MP selected as being representative of the optimization problem to be solved. In certain example embodiments, the initial solution may be an elite solution that satisfies halting criteria for halting the GTTS processing. For example, in the case of the n-city, m-TSP optimization problem, the initial solution may be a permutation representative of a tour between the n cities, where the permutation contains one or more DCFs, each DCF being representative of a subtour between a disjoint subset of the n cities, and where a length of the tour is deemed to be suitably optimized. Alternatively, the initial solution (e.g., an initially chosen permutation) may be an optimal solution if no other permutation (e.g., tour) exists that has at least one arc that has a negative entry in $^PD$.

In other example embodiments, the initial solution may not be an elite solution that satisfies the halting criteria, in which case, the GTTS module 114 may determine an initial fragmentation of the solution space and may assign each solution space fragment to a respective GPU thread 128(1)-128(N) for processing. In certain example embodiments, the GTTS module 114 may determine a respective initial solution for each solution space fragment. In certain example embodiments, the operations at blocks 608-618 may correspond to processing performed by a particular GPU thread with respect to a particular solution space fragment. More specifically, the operations at blocks 608-618 may correspond to an STM phase of GTTS processing in accordance with example embodiments of the disclosure.

At block 610, a GPU thread 128 may determine a neighborhood of solutions associated with a current solution. During a first iteration of the GTTS processing, the initial solution may be the current solution referenced at block 610. In certain example embodiments, the move methods that may be used to determine the neighborhood at block 610 may be determined from a recent history of previous move methods. For example, certain moves may be temporarily restricted, a profile of desirable elite solutions may be used to guide the move methods, and so forth. At block 610, the move methods used to determine a neighborhood of solutions associated with the current solution may be chosen based on one or more constraints such as, for example, a constraint that cycle structure of the current solution is to be maintained, a constraint that a particular subpath of the current solution is to be maintained, and so forth.

At block 612, the GPU thread 128 may select a member of the neighborhood as a new current solution. In certain example embodiments, recent search history may impact the new current solution selected at block 612. Further, a desire to preserve cycle structure, maintain relative positions of specified disjoint p-subpaths, or the like may influence the selection of the new current solution.

At block 614, the GPU thread 128 may update a set of elite solutions. For example, the GPU thread 128 may include the new current solution in the set of elite solutions. Then, at block 616, the GPU 128 may determine whether halting criteria are satisfied for halting the GTTS processing being performed by the GPU 128. The halting criteria may include, for example, whether a time constraint has been met, whether an elite solution has been obtained that satisfies an optimization threshold, whether a threshold number of iterations of the GTTS processing have been performed, or the like. In response to a negative determination at block 616, the method 600 may proceed iteratively from block 610. On the other hand, in response to a positive determination at block 618, the GPU thread 128 may select a particular solution in the set of elite solutions as the final solution of the MP representative of the optimization problem based at least in part on one or more selection parameters. For example, a GPU thread 128 may select an elite solution that minimizes or maximizes one or more objective functions of the MP among the set of elite solutions.

Figure 7:
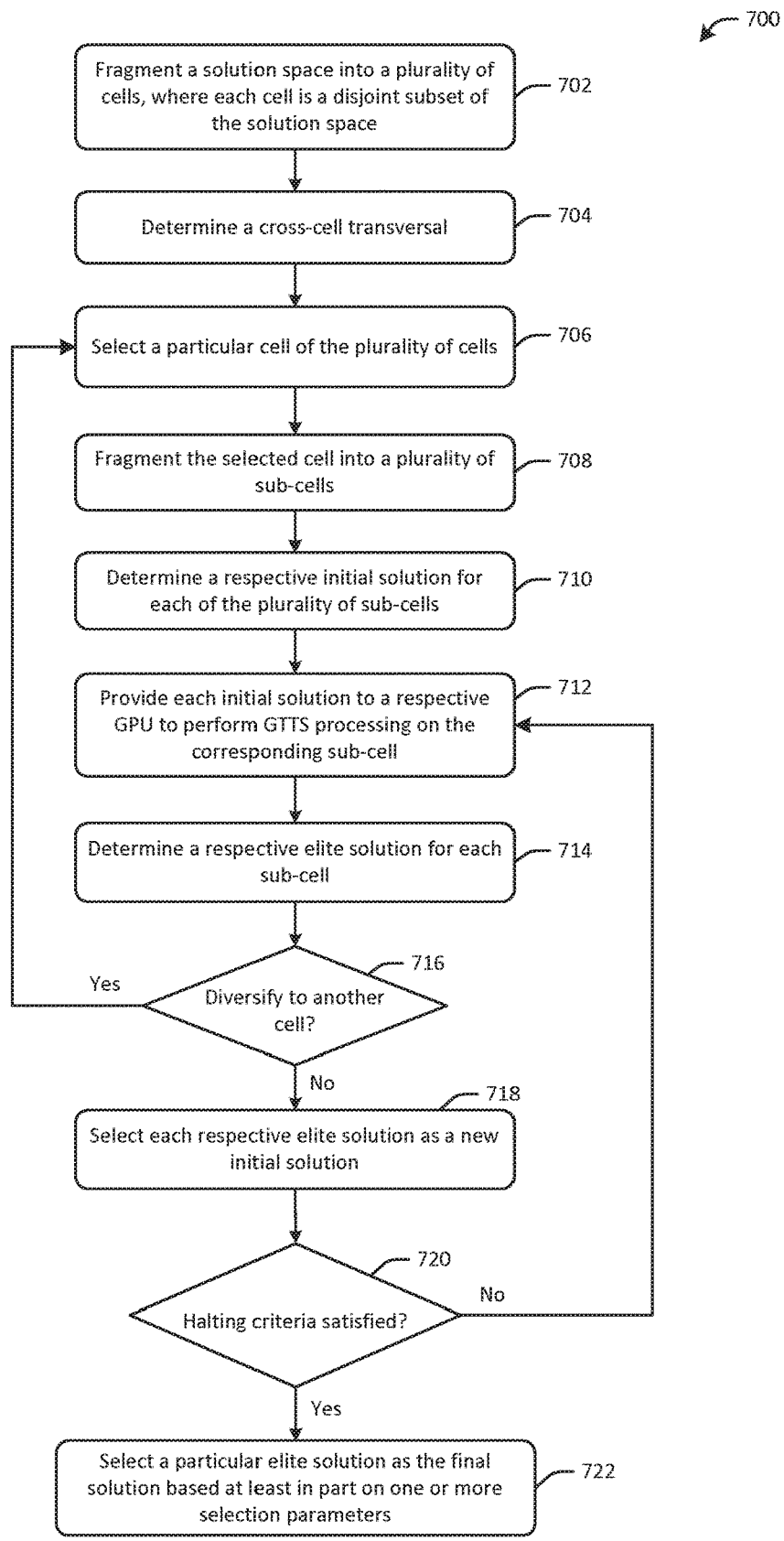
FIG. 7 is a process flow diagram of an illustrative method for fragmenting a solution space into a plurality of cells, fragmenting each cell into a plurality of sub-cells, and providing each sub-cell to a respective GPU for executing GTTS processing on each sub-cell in accordance with one or more example embodiments of the disclosure.

FIG. 7 is a process flow diagram of an illustrative method 700 for fragmenting a solution space into a plurality of cells, fragmenting each cell into a plurality of sub-cells, and providing each sub-cell to a respective GPU thread for executing GTTS processing in accordance with one or more example embodiments of the disclosure. FIG. 7 will be described in connection with FIG. 1 hereinafter.

At block 702, the GTTS module 114 may fragment a solution space into a plurality of cells. Each cell may be a disjoint subset of the solution space. For example, the fragmentation performed at block 702 may split the solution space $\Omega$ (e.g., a symmetric group) into disjoint subsets referred to as cells. As previously described, an initial solution may determine the initial fragmentation of Ω. That is, negative entries in the matrix $^P D$ (described in more detail hereinafter) may identify the arcs among which is one that yields a better solution than the initial solution. This use of $^P D$ may be expanded into one that fragments Ω. More specifically, selected negative arcs corresponding to negative entries in the matrix $^P D$ may be used to form cycles that generate a proper subgroup H of Ω. In turn, the group action $_H\Omega$ may split Ω into orbits that represent the diversification cells.

The GTTS processing may include a mechanism for ensuring that previously explored elite solutions are not explored again. In particular, at block, the GTTS module 113 may determine a cross-cell transversal. The GTTS processing performed by a GPU thread 128 may visit the orbits by utilizing the cross-cutting transversal T (also referred to herein as a diversification transversal). The elements of the diversification transversal may index the orbits (the diversification cells) and when T is suitably small, may store data indicating that the orbits have been visited. This may ensure anti-cycling and may avoid hash structures.

In certain example embodiments, assigning the exploration of each diversification cell to a different GPU thread may not be feasible within a time constraint associated with an optimization problem since exploration of a diversification cell may be demanding. Rather, the GPU threads may be used to explore a single diversification cell, with the GTTS module 114 managing movement along the diversification transversal. Exploration of a single diversification cell may include a short term memory (STM) phase and an intensification phase of tabu search. The STM phase may include exploration of a diversification cell to determine elite solution(s). When an STM phase fails to produce any additional elite solution, the GTTS processing may return to the most elite solution determined thus far and may initiate an intensification phase in connection with the most elite solution. For example, the GTTS processing may initiate a new STM phase in connection with the most elite solution. When that new STM phase fails to produce any additional elite solution, the GTTS processing may again initiate the process at the most elite solution. If that most elite solution is the same as a previously chosen elite solution, the GTTS processing may instead continue with the next best elite solution. Alternatively, the GTTS processing may initiate multiple new STM phases in parallel from respective multiple elite solutions.

The majority of the processing load on the GPU threads may occur during the STM phases of the GTTS processing. Since each GPU thread may explore the same diversification cell, the GTTS module 114 may select a particular cell Λ of the plurality of cells at block 706, and may fragment the cell Λ into a plurality of sub-cells at block 708. Each sub-cell may then be explored by a corresponding GPU thread as part of a parallel search. In particular, at block 710, the GTTS module 114 may determine a respective initial solution for each of the plurality of sub-cells. The GTTS module 114 may then provide each initial solution to a respective GPU thread 128 to perform GTTS processing on the corresponding sub-cell.

At block 714, the GTTS module 114 may receive a respective elite solution corresponding to each sub-cell. More specifically, the GTTS module 114 may receive the computational results from each GPU thread, where each GPU thread may have determined one or more elite solutions based at least in part on the GTTS processing performed on its corresponding sub-cell. At block 716, the GTTS module 114 may determine whether to diversify exploration of the solution space to another cell. In response to a positive determination at block 716, the method 700 may proceed to block 706, where a new cell of the plurality of cells may be selected for fragmentation into a corresponding plurality of sub-cells. On the other hand, in response to a negative determination at block 716, the method 700 may proceed to block 718, where the GTTS module 114 may select each respective elite solution as a new initial solution for the GTTS processing performed by the various GPUs.

At block 720, the GTTS module 114 may determine whether halting criteria are satisfied for halting the GTTS processing. In response to a negative determination at block 720, the method 700 may proceed iteratively from block 712. On the other hand, in response to a positive determination at block 720, the method 700 may proceed to block 722, where the GTTS module 114 may select a particular elite solution as the final solution to an MP representative of an optimization problem. The final solution selected at block 722 may be selected based at least in part on one or more selection parameters. For example, the final solution selected at block 722 may be a most elite solution determined among all elite solutions identified during the GTTS processing.

Referring again to the n-city, m-TSP problem for illustrative purposes, the final solution sought for this problem is a derangement (e.g., a permutation in which each element is mapped to an element other than itself) having minimum tourlength. Accordingly, given an initial solution represented by the permutation p and a candidate solution represented by the permutation q, the GTTS processing may determine whether q is an elite solution by determining whether q has a shorter tourlength than p. Computing a tourlength involves many additions and when done numerous times during GTTS processing as described herein, the computational burden may be significant.

Accordingly, in certain example embodiments, the tourlength difference given by tourlength(q)−tourlength(p) may be computed since when negative, the permutation q has a shorter tourlength. This tourlength difference may be computed without computing the individual tourlengths of p and q since the lengths of common arcs cancel out in the tourlength difference leaving just the non-common arcs. The non-common arcs may be determined as those arcs whose tails are given by $\text{mov}(qp^{-1}) = \text{mov}(pq^{-1})$. This equality holds because $(qp^{-1})^{-1} = pq^{-1}$ and a permutation and its inverse move the same letters. In arc t→h, t and h are respectively the arc's tail and head. For an n× n, 0-diagonal distance matrix D, the tourlength of $p \in S_n$ is the sum of its arclengths.

A mathematical formulation of this statement is shown below. In the mathematical formulation below, $k^p$ is the p-image of letter k.

$$tourlength(p) = \sum_{k=1}^{n} D(k, k^p)$$

Thus:

$$\Delta_{qp} = tourlength(q) - tourlength(p) = \sum_{k} D(k, k^q) - D(k, k^p) = \sum_{k \in mov(qp^{-1})} D(k, k^q) - D(k, k^p) = \sum_{k \in mov(qp^{-1})} {}^p D(k, k^q)$$

Here, $^PD$ is a matrix whose (i, j)'th entry is $D_{ij}$ minus $D(i, i^P)$. In turn, $\Delta_{qp}$ is found by adding the entries of $^PD$ that q traces over mov(q p$^{-1}$). Note that the main diagonal entries of $^PD$ need not be zero because if q isn't a derangement and doesn't move k∈mov(q p$^{-1}$) then $$^PD(k,k^q)=D(k,k^q)-D(k,k^p)=D(k,k)-D(k,k^p)=0-D(k,k^p)=-D(k,k^p)$$

As an example, in $S_5$, let p=(1, 4) (2, 5, 3) and q=(2, 3, 4, 1). In this example, q is not a derangement since the element 5 maps to itself

| Distance Matrix D | Trace of p = (1,4) (2,5,3) | $^PD$ | $^PD$ traced by q = (2,3,4,1) |
|---|---|---|---|
| $\begin{pmatrix} 0 & 15 & 1 & 68 & 4 \\ 66 & 0 & 98 & 69 & 75 \\ 16 & 25 & 0 & 91 & 84 \\ 71 & 2 & 31 & 0 & 26 \\ 45 & 74 & 70 & 57 & 0 \end{pmatrix}$ | $\begin{pmatrix} 0 & 15 & 1 & \mathbf{68} & 4 \\ 66 & 0 & 98 & 69 & \mathbf{75} \\ 16 & \mathbf{25} & 0 & 91 & 84 \\ \mathbf{71} & 2 & 31 & 0 & 26 \\ 45 & 74 & \mathbf{70} & 57 & 0 \end{pmatrix}$ | $\begin{pmatrix} -68 & -53 & 67 & 0 & -64 \\ -9 & -75 & 23 & -6 & 0 \\ -9 & 0 & -25 & 66 & 59 \\ 0 & -69 & -40 & -71 & -45 \\ -25 & 4 & 0 & -13 & -70 \end{pmatrix}$ | $\begin{pmatrix} -68 & \mathbf{-53} & 67 & 0 & -64 \\ -9 & -75 & \mathbf{23} & -6 & 0 \\ -9 & 0 & -25 & \mathbf{66} & 59 \\ 0 & -69 & -40 & -71 & -45 \\ -25 & 4 & 0 & -13 & \mathbf{-70} \end{pmatrix}$ |

With p=(1, 4) (2, 5, 3) and q=(2, 3, 4, 1), mov(qp$^{-1}$)=mov ((1, 3) (2, 5))={1, 2, 3, 5}. The trace of q over {1, 2, 3, 5} may then be computed to yield $$\begin{pmatrix} x & 1 & 2 & 3 & 5 \\ x^q & 2 & 3 & 4 & 5 \end{pmatrix}$$

where each column gives the row/column location of the entry bolded in the last matrix shown above. Adding the bolded entries in the last matrix, tourlength(q)−tourlength(p)=−53+23+66−70=−34. Alternatively, tourlength(q)=275, tourlength(p)=309 and 275−309=−34.

The utility of the formula for $\Delta_{qp}$ depends upon mov (qp$^{-1}$) and the processing capacity/time required to compute qp$^{-1}$. As mov(qp$^{-1}$) grows, the formula for $\Delta_{qp}$ may become less useful, ultimately potentially yielding no processing capacity/time savings over computing a full tourlength. While this may generally be the case, example embodiments of the disclosure may transform p into q using methods that preserve much of p. In turn, many common arcs cancel out in calculating the tourlength difference, thereby yielding a small mov(qp$^{-1}$).

Various mechanisms are available for transforming one permutation into another. Three such mechanisms are left permutation composition, right permutation composition, and conjugation. Assuming that m∈$S_n$, left permutation composition of permutation p with permutation m may be represented as q=mp. Thus qp$^{-1}$ (mp)p$^{-1}$=m and so mov (qp$^{-1}$)=mov(m). In such an example, there may be no need to compute qp$^{-1}$ since it moves only those letters in m. As another example, right permutation composition of permutation p with permutation m may be represented as q=pm. Thus qp$^{-1}$ (pm)p$^{-1}$=m$^{-p}$ and so qp$^{-1}$ has as many letters as m since conjugation preserves cycle structure. Note that if t→h is a p-arc then t$^p$=h or equivalently, t=h$^{-p}$. Thus the letters in m$^{-p}$ are the tails of the p-arcs whose heads are the letters in m. As another example, conjugation of the permutation p with the permutation m may be represented as q=p$^m$. Thus qp$^{-1}$=p$^m$p$^{-1}$=(m$^{-1}$pm)p$^{-1}$=m$^{-1}$(pmp$^{-1}$)=m$^{-1}$m$^{-p}$, thereby indicating that qp$^{-1}$ moves at most twice the letters in m.

A fourth mechanism for transforming a permutation into another permutation is to raise a permutation to a power. One mechanism for building a neighborhood of p is to build <p>, the smallest subgroup that contains p. For instance, the tables below (in which ( ) is the identity) show <p> for different permutations p:

TABLE 1

| m | p$^m$ |
|---|---|
| 1 | (1, 2, 3, 4, 5, 6, 7, 8, 9, 10, 11, 12) |
| 2 | (1, 3, 5, 7, 9, 11)(2, 4, 6, 8, 10, 12) |
| 3 | (1, 4, 7, 10)(2, 5, 8, 11)(3, 6, 9, 12) |
| 4 | (1, 5, 9)(2, 6, 10)(3, 7, 11)(4, 8, 12) |
| 5 | (1, 6, 11, 4, 9, 2, 7, 12, 5, 10, 3, 8) |
| 6 | (1, 7)(2, 8)(3, 9)(4, 10)(5, 11)(6, 12) |
| 7 | (1, 8, 3, 10, 5, 12, 7, 2, 9, 4, 11, 6) |
| 8 | (1, 9, 5,)(2, 10, 6)(3, 11, 7)(4, 12, 8) |
| 9 | (1, 10, 7, 4)(2, 11, 8, 5)(3, 12, 9, 6) |
| 10 | (1, 11, 9, 7, 5, 3)(2, 12, 10, 8, 6, 4) |
| 11 | (1, 12, 11, 10, 9, 8, 7, 6, 5, 4, 3, 2) |
| 12 | ( ) |

TABLE 2

| m | p$^m$ |
|---|---|
| 1 | (1, 2, 3)(4, 5, 6, 7) |
| 2 | (4, 6)(5, 7)(1, 3, 2) |
| 3 | (4, 7, 6, 5) |
| 4 | (1, 2, 3) |
| 5 | (1, 3, 2)(4, 5, 6, 7) |
| 6 | (4, 6)(5, 7) |
| 7 | (1, 2, 3)(4, 7, 6, 5) |
| 8 | (1, 3, 2) |
| 9 | (4, 5, 6, 7) |
| 10 | (4, 6)(5, 7)(1, 2, 3) |
| 11 | (1, 3, 2)(4, 7, 6, 5) |
| 12 | ( ) |

TABLE 3

| m | $p^m$ |
|---|---|
| 1 | (1, 2, 3, 4, 5, 6, 7) |
| 2 | (1, 3, 5, 7, 2, 4, 6) |
| 3 | (1, 4, 7, 3, 6, 2, 5) |
| 4 | (1, 5, 2, 6, 3, 7, 4) |
| 5 | (1, 6, 4, 2, 7, 5, 3) |
| 6 | (1, 7, 6, 5, 4, 3, 2) |
| 7 | ( ) |

In the bolded rows of Table 1, $p^m$ has p's cycle structure because m is coprime to 12=order(p). The last table is a special instance of this since the prime number 7 is coprime to the smaller numbers. So, if cycle structure must be preserved then these coprime powers will do so. Otherwise, the DCFs of $p^m$ have the same length that divides order(p). The resulting cycle structures can be transformed using templates (permutations that split and merge other permutations) to yield permutations that have a target cycle structure. Given n-cycles p,q∈$S_n$, the solution space of $p^x=q$ depends upon the subgroup generated by p (e.g., <p>).

In certain example embodiments, if cycle structure is to be preserved, then conjugation may be the move method of choice for GTTS processing. More specifically, to move from a permutation p to a permutation q having the same cycle structure as p, a permutation x that satisfies $p^x=q$ may be sought. Several such permutations x may exist since the solution space is the right coset $cent_p r$ for $cent_p$ (the centralizer of p in $S_n$) and r (any specific solution). An example approach for determining an r may be to align (in a 2-row matrix) the given p and q on their DCFs, strike the cycle boundaries, and then view the resulting table as a standard form permutation. For instance, if p=(4, 2) (1, 5, 3) and q=(2, 4, 1) (3, 5):

$$\begin{pmatrix}(4,2)(1,5,3)\\(2,4,1)(3,5)\end{pmatrix} \stackrel{align}{=}$$

$$\begin{pmatrix}(4,2)(1,5,3)\\(3,5)(2,4,1)\end{pmatrix} \stackrel{strike}{\underset{boundaries}{=}} \begin{pmatrix}4&2&1&5&3\\3&5&2&4&1\end{pmatrix} = (4,3,1,2,5) = r$$

Thus $q=p^r$, i.e., $((4, 2) (1, 5, 3))^{(4,3,1,2,5)}$=(2, 4, 1)(3, 5).
In the case of an n-city 1-TSP, $cent_p$=<p>. For instance, in $S_6$ with p=(3, 1, 2, 6, 5, 4) and q=(6, 1, 3, 5, 2, 4), the solution space of $p^x=q$ is $cent_p$ r:

$$r = \begin{pmatrix}3&1&2&6&5&4\\6&1&3&5&2&4\end{pmatrix} = (3,6,5,2)$$

$cent_p = <p> = \{p, p^2, p^3, p^4, p^5, p^6 = e\} =$ (1, 2, 6, 5, 4, 3) | (1, 6, 4) (2, 5, 3) | (1, 5) (2, 4) (3, 6)
(1, 4, 6) (2, 3, 5) | (1, 3, 4, 5, 6, 2) | ( )

The solution space is the right coset $$cent_p r = \{cr : c \in cent_p\} = \begin{matrix}(1,3)(2,5,4,6) & (1,5,6,4) & (1,2,4,3,5)\\(1,4,5,3,2,6) & (1,6,3,4,2) & (2,3,6,5)\end{matrix}$$

Thus for any x in the above coset, $(3, 1, 2, 6, 5, 4)^x$=(6, 1, 3, 5, 2, 4)

Accordingly, choosing different permutations x from the above coset can result in diversification of the GTTS processing. Another implication is that a new search can begin on moves rather than TSP tours. That is, rather than having a GPU thread probe conjugates of p, a GPU thread may instead probe any transversal of the right cosets of $cent_p$. When this search yields s as the optimal transversal element, $p^s$ may be the optimal tour in p's conjugacy class. The most optimal approach for searching the transversal may not be known, but the indexing set of $\Delta_{qp}$ and the form of $^pD$ may suggest an approach.

In accordance with example embodiments of the disclosure, a transversal may be constructed of the right cosets of the centralizer of p=(1, 2, 3, 4, 5) in $S_5$. Because p is a 5-cycle in $S_5$, its centralizer in $S_5$ is <p> whose order is 5. Per Lagrange's Theorem, there are 5!/5=4!=24 cosets. Any transversal T of the cosets may be constructed, and the GTTS processing may be shifted away from the tours to the transversal T. The elements of the transversal T have diverse cycle structures that can be chosen to move a minimal number of letters. $p^7k$ may be the tour associated with the k'th transversal element. More specifically, any element chosen from that coset yields the same tour, consumes less memory than the tour, and no more memory than another coset member.

Example Carrier Dispatch Optimization

In one implementation, the methods, systems and operations described herein may be utilized for carrier dispatch optimizations. A multiple carrier dispatch optimization architecture may be utilized to ensure that one or more vehicles (e.g., cars, trucks, vans, automobiles, motorcycles, off-road vehicles, boats, recreational vehicles (RVs), machinery, and/or the like) are optimally transported (e.g., shipped, moved, picked up, delivered, and/or the like) by one or more carriers (e.g., shippers, truckers, deliverers, and/or the like) following one or more vehicle transactions (e.g., sales, purchases, trades, manufactures, gifts, repossessions, leases, and/or the like). In some embodiments, a carrier may include a fleet of carriers, or may include an individual and/or independent carrier. In one example, each carrier truck may be capable of transporting or carrying a different number of vehicles(1, 3, 5, 10 and/or the like).

For example, if a first vehicle is purchased from a seller in Atlanta and needs to be transported to a first purchaser in New York, and a second vehicle is purchased from the seller in Atlanta and needs to be transported to a second purchaser in Boston, the multiple carrier dispatch optimization architecture may be utilized to determine an optimal delivery route for each vehicle using one or more carriers. Continuing with the example, the first and second vehicles may be assigned by the multiple carrier dispatch optimization architecture to a first carrier to transport both of the first and second vehicles from Atlanta to the Northeast. The first carrier may pick up the first and second vehicles in Atlanta, drive to New York and deliver the first vehicle to the first purchaser, and then continue driving to Boston to deliver the second vehicle to the second purchaser. Alternatively, the first and second vehicles may be assigned by the multiple carrier dispatch optimization architecture to the first carrier to transport both of the first and second vehicles from Atlanta to New York only. In New York, the first carrier may deliver the first vehicle to the first purchaser in New York, and then may drop off the second vehicle in New York, where the second vehicle is to be picked up by a second carrier. The second vehicle may be assigned by the multiple carrier dispatch optimization architecture to a second carrier to transport the second vehicle from New York to Boston to therefore deliver the second vehicle to the second purchaser in Boston. In this manner, one or more vehicles may be assigned to one or more carriers by the multiple carrier dispatch optimization architecture to ensure optimal transportation of the one or more vehicles from respective first locations to respective second locations.

Additionally, if a carrier is currently scheduled to drive from Atlanta to Boston and is planning to stop in New York to deliver a vehicle on the way from Atlanta to Boston, the carrier may utilize the multiple carrier dispatch optimization architecture to identify another vehicle in New York that needs to be delivered to Boston. In this manner, the carrier is enabled to more efficiently schedule pick-ups and/or deliveries along a route.

Figure 8:
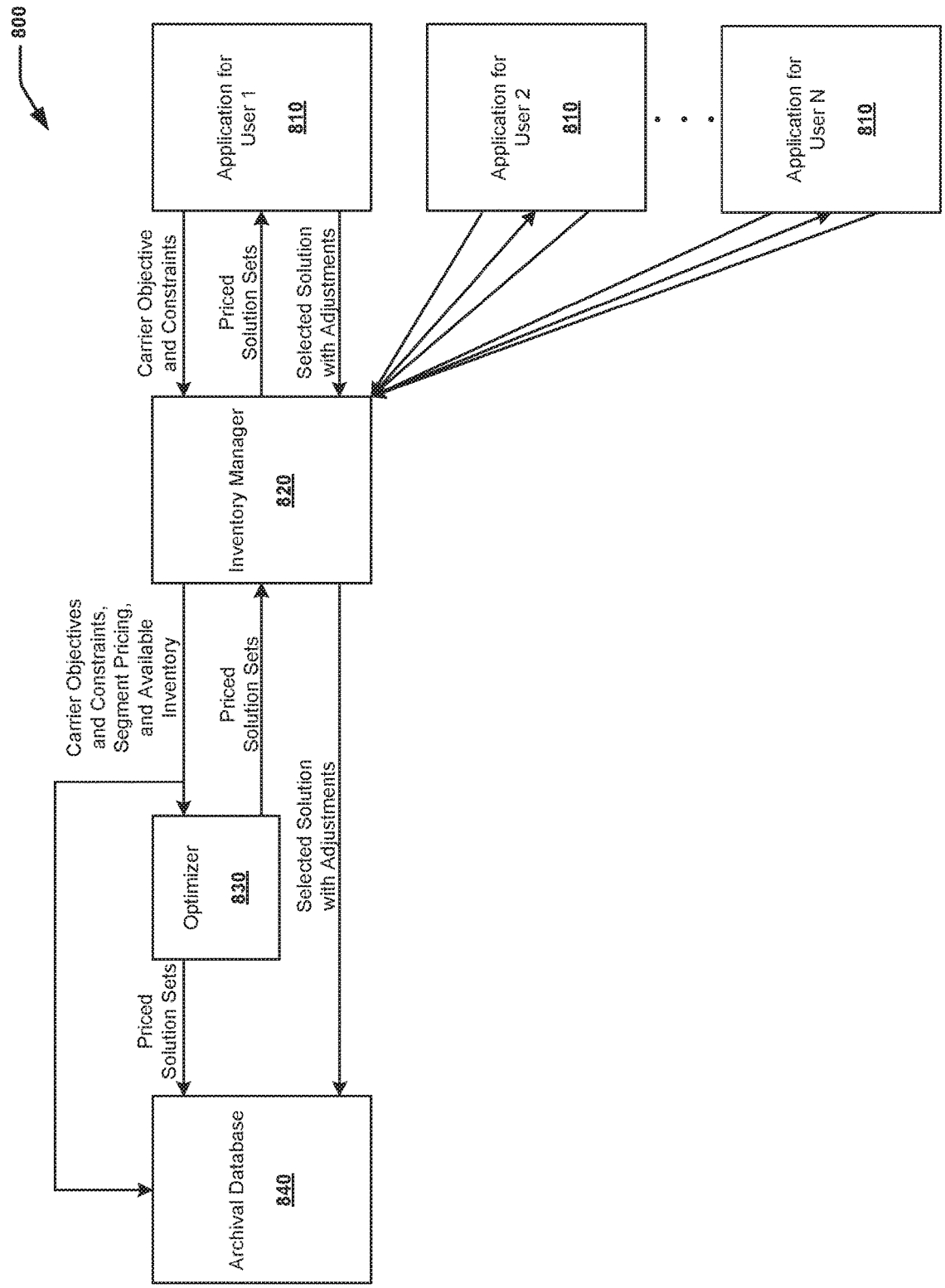
FIG. 8 depicts an example system environment for multiple carrier dispatch optimization, according to one embodiment of the disclosure.

FIG. 8 illustrates an example system environment 800 for a multiple carrier dispatch optimization, according to an embodiment of the disclosure. The system environment 800 typically includes at least one user application 810, which may be accessed and/or controlled by a user. In some embodiments, the system environment 800 includes multiple user applications 810 as depicted in FIG. 8 for enabling multiple users to utilize the multiple carrier dispatch optimization architecture.

In some embodiments, the user typically includes a carrier (e.g., a shipper, a cargo trucker, a driver, a carrier dispatcher, and/or the like), but may also include a seller, a purchaser, a gifter, a giftee, a trader, an auctioneer, a repossessor, and/or the like of a vehicle, and/or the like. The user may utilize the user application 810 to initiate operation of the multiple carrier dispatch optimization architecture by providing one or more carrier objectives and/or carrier constraints. For example, the user may input and/or upload one or more carrier objectives and/or carrier constraints to the user application 810. Alternatively, carrier objectives and/or carrier constraints may be received from a third party, or by scraping (e.g., automatically retrieving information from) one or more social media accounts, email accounts, user preferences of one or more online accounts, carrier databases, and/or the like.

Carrier objectives and/or carrier constraints may include route information such as a start location, a destination location, a current location, a start date and/or time, an ending date and/or time, an active region (e.g., a territory of states) of operation, locations to avoid, and/or the like. Further, carrier objectives and/or carrier constraints may be directed to carrier type such as a truck selection, a truck make and/or model, a trailer make and/or model, a truck size, a trailer size, a maximum quantity of vehicles and/or a maximum weight that the carrier is enabled to transport (e.g., a carrier capacity), maximum dimensions for a carrier payload, possible vehicle loading configurations of the carrier, a year of the carrier, gas mileage of the carrier, an insurance status of the carrier, and/or the like. Carrier objectives and/or carrier constraints may also include particular constraints for unique abilities of a carrier, such as the carrier being enclosed, being able to carry an inoperable vehicle, being able to carry a particular type of vehicle (e.g., a motorcycle, a boat, and/or car), and/or the like. Further, if a carrier has multiple slots for multiple vehicles, the user may denote carrier constraints for each individual slot. For example, a first slot of a carrier may be configured for transporting a motorcycle, while a second slot of a carrier may be configured for transporting a boat. Further, one slot may be configured to transport different vehicle types. In some embodiments, specific hardware (e.g., straps, modification equipment, and/or the like), may be necessary for modifying a slot for transporting a first vehicle of a first vehicle type so that, after modification, the slot may transport a second vehicle of a second vehicle type. Accordingly, this modifying ability of slots may be included as carrier objectives and/or carrier constraints. Additionally, carrier objectives and/or carrier constraints may also include constraints related to the Department of Transportation (DOT), such as the carrier not being allowed to travel on particular roads due to weight, truck size, and/or the like. Further carrier objectives and/or carrier constraints may include various import and/or export regulations associated with crossing from one location into another (e.g., from country to country, and/or the like). In some embodiments, particular carrier objectives and/or constraints may be required by the user application 810, or in other embodiments may be optional.

The at least one user application 810 typically communicates with an inventory manager 120. For example, the at least one user application 810 may provide carrier objectives and/or carrier constraints received from the user to the inventory manager 820 for processing.

The inventory manager 820 typically includes vehicle records of all available vehicles to be transported. A vehicle record typically includes information and/or attributes associated with a vehicle such as an internal identification number (ID), a vehicle identification number (VIN), a year, a make, a model, trim, a weight, a size, an operable status, an enclosed status, a pickup address (e.g., street, city, state, ZIP, and/or the like), a pickup region, a delivery address (e.g., street, city, state, ZIP, and/or the like), a delivery region, a start date and/or time, and/or the like. Information and/or attributes associated with a vehicle may further include information associated with a party (e.g., a shipper, a purchaser, a seller, and/or the like) in a vehicle transaction involving the vehicle such as a purchase order (PO) number, account information, an address, a shipping and/or delivery price, a segment price (e.g., a price of transporting a vehicle along a segment of a particular route, such as a segment between Baltimore and Philadelphia on a route from Atlanta to New York, or a portion of a transport that may be accomplished by another mode, for instance a portion in which the vehicle is moved by train or boat), and/or the like. Information and/or attributes of a vehicle may also include an amount of time that the vehicle has been in queue, progress, and/or staging in the multiple carrier dispatch optimization architecture. Information and/or attributes associated with one or more vehicles may be provided by a party involved in a vehicle transaction, by scraping a vehicle database associated with a vendor, a VIN decoding database, wholesale auction databases, vehicle inspection databases, manufacturer, a seller, a dealership, a broker, and/or the like, and/or in a variety of other ways. In some embodiments, information and/or attributes associated with one or more vehicles may be imported from one or more databases.

The inventory manager 820 typically processes received carrier objectives and/or carrier constraints to identify one or more vehicle records of one or more vehicles that are available to the carrier based on the carrier objectives and/or carrier constraints provided by the user (e.g., received from the user application 810). For example, the inventory manager 820 may filter and/or sort one or more vehicle records of one or more vehicles based on a comparison of received carrier objectives and/or carrier constraints and information and/or attributes included in the one or more vehicle records of one or more vehicles. In some embodiments, the inventory manager 820 may determine at least a partial match between carrier objectives and/or carrier constraints and information and/or attributes included in the one or more vehicle records of one or more vehicles. Determining at least a partial match between carrier objectives and/or carrier constraints and information and/or attributes may cause the inventory manager 820 to determine that one or more vehicle records of one or more vehicles are eligible (e.g., available) to be transported by the carrier. In some embodiments, the inventory manager 820 may generate a listing of all vehicle records (e.g., vehicles) that are available for transport by the carrier. The listing may be sorted and/or ranked based on a calculated score of each available vehicle record, where the calculated score corresponds to a benefit, cost, price, and/or the like of transporting each available vehicle record. In some embodiments, the calculated score may be determined by the inventory manager 820 based on determining at least a partial match between carrier objectives and/or carrier constraints and information and/or attributes of each vehicle, a price, a cost, a profit, and/or the like of the carrier transporting each vehicle, and/or the like. Also, the calculated score of a vehicle and/or segment may be compared to one or more threshold values corresponding to a likelihood of acceptance by the carrier and/or inclusion in one or more optimized solution sets.

The inventory manager 820 may, after identifying one or more vehicle records of one or more vehicles that are available to the carrier based on carrier objectives and/or carrier constraints, transmit the one or more vehicle records of the one or more vehicles determined to be available to the carrier to an optimizer 830 for processing. The inventory manager 820 may also transmit the carrier objectives and/or carrier constraints, information and/or attributes comprised in the one or more vehicle records of the one or more vehicles to the optimizer 830 for processing. In some embodiments, the one or more vehicle records of the one or more vehicles determined to be available to the carrier may be transmitted from the inventory manager 820 to the optimizer 830 via a data stream of one or more data packets, by generating a downloadable file, uploading the file to a service, and transmitting a link which allows a download of the file to be initiated, and/or the like.

The optimizer 830 may process information received from the inventory manager 820 to generate one or more optimized solution sets of vehicle loads for the carrier based on the information received from the inventory manager 820 (e.g., vehicle records, carrier objectives and/or carrier constraints, information and/or attributes included in the one or more vehicle records of the one or more vehicles, and/or the like). For example, the optimizer 830 may group together (e.g., bundle) one or more vehicles based on a common pick-up and/or delivery location, the calculated score of each available vehicle, and/or the like. The optimizer 830 may further identify one or more matches of information and/or attributes included in the one or more vehicle records of the one or more vehicles. Alternatively, the optimizer 830 may bundle one or more vehicles based on an estimated delivery price and/or route segment price in a way that maximizes an amount of carrier profit, minimizes a distance to be traveled when a carrier is loaded below capacity, a cost, minimizes a distance between a scheduled pick-up and/or delivery location of one or more vehicles included in an optimized solution set and an existing carrier location and/or planned route, maximizes a dispatch and/or carrier revenue per day and/or revenue per mile, and/or an amount of time for the carrier to transport vehicles included in the one or more optimized solution sets, and/or provides other benefits to the carrier. In this manner, vehicles may be grouped and/or bundled together into an optimized solution set that provides one or more optimal routes of transporting the included vehicles. The one or more optimized solution sets of vehicle loads for the carrier may include one or more routes for the carrier to pick up and/or deliver (e.g., transport) one or more vehicles identified by the inventory manager 820 as available to be transported by the carrier. For example, the one or more optimized solution sets may include a list of vehicles available for pick-up and/or delivery at particular locations and/or along a particular carrier route.

For example, the optimizer 830 may determine a total dispatch profit of an optimized solution set by summing revenue associated with transporting each vehicle included in the optimized solution set and then subtracting carrier cost associated with transporting each vehicle included in the optimized solution set, wherein cost associated with transporting each vehicle may be determined by multiplying a total distance traveled by a carrier cost per mile. Additional factors that are utilized to determine a dispatch profit of one or more vehicles and/or vehicle segments may include a length of a route, a pick-up location, a delivery location, a shipping cost, a carrier cost, unique loading constraints, licensing/permitting requirements, and/or the like. Weights may be assigned to one or more variables and/or factors when a determining profit and/or cost of transporting a vehicle (e.g., a vehicle segment). The optimizer 830 may then compare each determined total dispatch profit of all solution sets generated for the user (e.g., carrier) to determine an optimized solution set that has a highest dispatch profit.

It is noted that the optimizer 830 may not only aim to maximize profit for each carrier, but may also aim to maximize profit for a dispatcher associated with the system environment 800 described herein. For example, each vehicle may be associated with a cost for transport allocated by a selling party (or donating party, trading party, purchasing party, and/or the like) and/or a selling platform (e.g., an auction house and/or website, an online marketplace, and/or the like) and a cost associated with a carrier actually transporting each vehicle. The optimizer 830 typically seeks to minimize the cost associated with the carrier while maximizing the cost for transport allocated by the selling party. In some embodiments, these costs may be fixed and/or dynamic based on a variety of conditions such as supply and demand, market value of a vehicle, time of year, month, week, day, and/or the like, weather conditions, carrier constraints and/or carrier objectives, vehicle attributes and/or information, and/or the like. In this manner, the optimizer 830 may be focused on providing a dispatcher-centric system for maximizing dispatch profits by optimally allocating one or more vehicles to be transported by one or more carriers to a minimum number of carriers. Therefore, the system environment 800 and embodiments disclosed here differ from a typical carrier-centric system, such as a delivery service optimization system. As opposed to assigning a set of known packages for optimized delivery by one or more trucks as may be done by a carrier-centric system, the system environment 800 of this disclosure may focus on selecting particular packages (e.g., vehicles) to be optimally assigned to one or more trucks (e.g., carriers) so as to maximize profits.

Upon generation, the one or more optimized solution sets may be transmitted from the optimizer 830 to the inventory manager 820, which may transmit the one or more optimized solution sets to the one or more user applications 810 for presentation to the user. The user (e.g., the carrier) may then review the one or more optimized solution sets and/or select one or more solution sets from the one or more optimized solution sets using the one or more user applications 810. In some embodiments, transmitting the one or more optimized solution sets may include generating an alert (e.g., a vibration, a visual alert, an auditory alert, and/or the like) and transmitting the alert in a message (e.g., an email, a text message, and/or the like) to the inventory manager 820 and/or the user via the one or more user applications 810.

The user may also be enabled to provide adjustments and/or modifications to the one or more optimized solution sets. For example, the user may add, delete, remove, swap, trade, and/or the like one or more vehicles included in the one or more optimized solution sets. In some embodiments, the user may initiate a request to trade one or more vehicles included a first optimized solution set with one or more vehicles included in a second optimized solution set. The user may also be presented with trade offers and/or suggested vehicles to be added, deleted, swapped, and/or the like by the one or more user applications 810. For example, one or more vehicles may be recommended to the user for selection and/or for addition to an optimized solution set. Suggestions of vehicles may be based on a variety of variables, information, and/or heuristics as disclosed herein, such as carrier constraints and/or carrier objectives, vehicle information and/or vehicle attributes, profit, cost, distance, location, density of vehicles in a particular location, and/or the like. In some embodiments, the user may be enabled to accept a trade offer for one or more vehicles from another user and/or carrier, and multiple users may be enabled to communicate with one another via the one or more user applications 810, such as a via an instant messaging system. In this manner, the one or more optimized solution sets may be further customized and/or optimized to preferences and/or desires of the user (e.g., carrier), therefore increasing efficiency and maximizing profit of the carrier when transporting the one or more vehicles included in a selected optimized solution set.

Typically, when a vehicle is included in an optimized solution set, the vehicle is exclusively included in the optimized solution set. For example, a vehicle record of a vehicle may be included in only one optimized solution set, which can then be accepted or rejected by the user. Including a vehicle in an optimized solution set typically includes removing a vehicle record of the vehicle included in the optimized solution set from the inventory manager 820 so that the vehicle record of the vehicle is no longer available for inclusion in a second optimized solution set. Alternatively, a vehicle record of a vehicle may be included in one or more optimized solution sets.

In response to a user selection of one or more optimized solution sets, the inventory manager 820 may assign information associated with the carrier (e.g., carrier objectives and/or carrier constraints) to information associated with the selected one or more optimized solution sets (e.g., information and/or attributes included in the one or more vehicle records of the one or more selected vehicles). In this manner, vehicles included in the selected one or more optimized solution sets may be assigned by the inventory manager 820 to the carrier for transport. Alternatively, vehicle profiles of vehicles included in one or more optimized solution sets that were not selected by the user may be transmitted and/or returned to the inventory manager 820 for processing and/or inclusion in another optimized solution set by the optimizer 830.

During the above-mentioned processes, information (e.g., carrier objectives and/or carrier constraints, information and/or attributes included in one or more vehicle records of one or more vehicles, and/or the like) may be transmitted to and/or received from the one or more user applications 810, the inventory manager 820, the optimizer 830, and/or an archival database 840. The archival database 840 may be continuously updated and/or updated at predetermined intervals with information from various elements of the system environment 800. In this manner, information stored in the archival database 840 may be utilized in various post-processing analyses. For example, the archival database 840 may receive and/or store the one or more selected optimized solution sets for later recall by the user.

Figure 9:
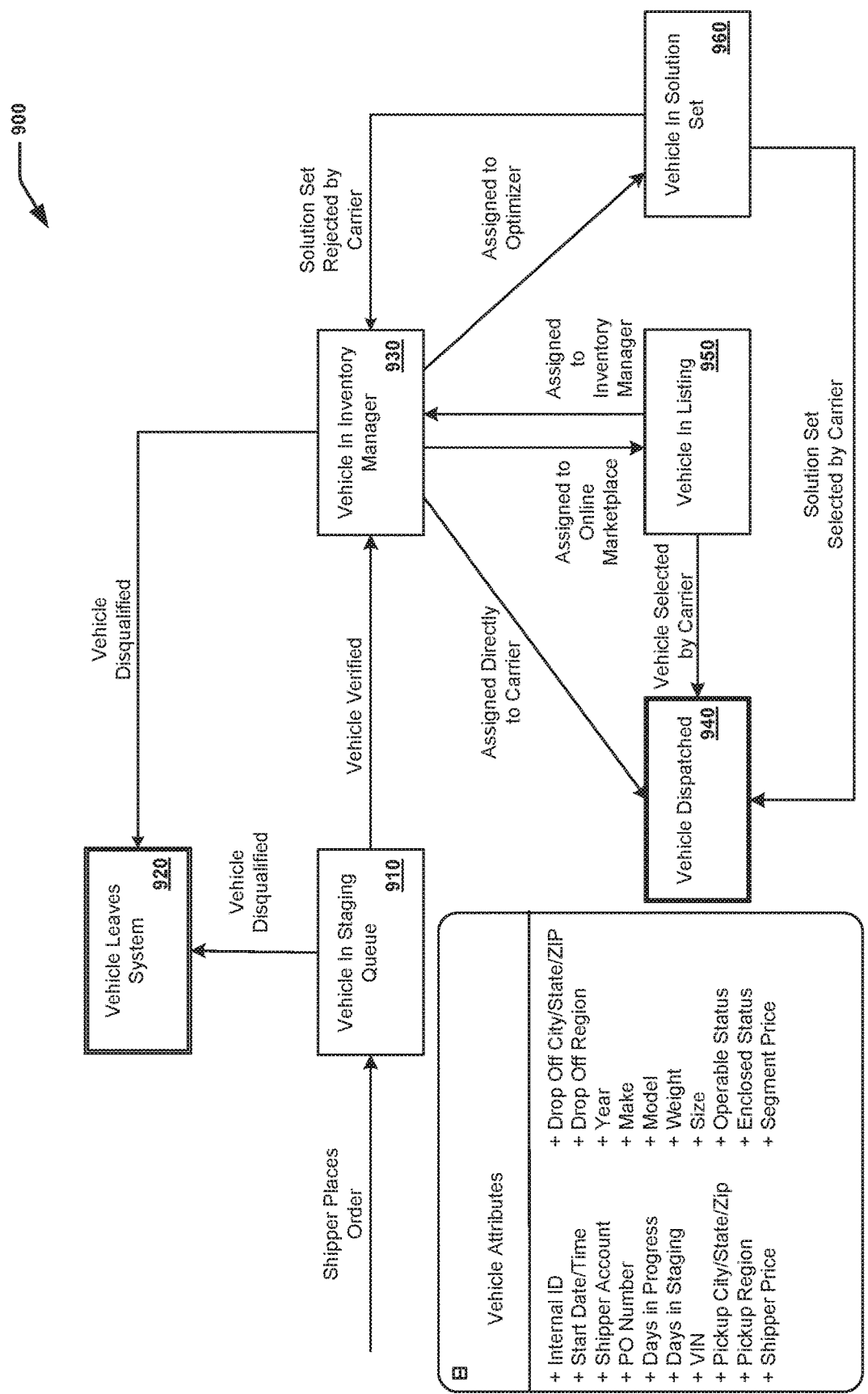
FIG. 9 is a process flow diagram of an illustrative method for optimally assigning a vehicle to a carrier for dispatch, according to one embodiment of the disclosure.

FIG. 9 is an example process flow diagram 900 illustrating details of an example method for optimally assigning a vehicle to a carrier for dispatch, according to one embodiment of the disclosure. The diagram 900 begins with receiving an order of a vehicle from a shipper (e.g., a seller, a buyer, a dealer, a broker, and/or the like) associated with a vehicle transaction. In some embodiments, the order is received at the one or more user applications 810 and/or from a system associated with facilitating vehicle transactions such as an auction website, a dealership website, an online marketplace, and/or the like. In some embodiments, receiving the order includes receiving information associated with the vehicle and/or the vehicle transaction such as information and/or attributes to be included in a vehicle record of the vehicle. Receiving the order typically includes generating a vehicle record of the vehicle using information and/or attributes of the vehicle. The vehicle record may be generated by the one or more user applications 810 and/or transmitted to the inventory manager 820 for generation by the inventory manager 820.

Again, a vehicle record typically includes information and/or attributes associated with the vehicle. For example, a vehicle record of a vehicle may include an internal identification number (ID), a vehicle identification number (VIN), a year, a make, a model, a weight, a size, aftermarket features that alter stock weight and/or dimensions, an operable status, an enclosed status, a pickup address (e.g., street, city, state, ZIP, and/or the like), a pickup region, a delivery address (e.g., street, city, state, ZIP, and/or the like), a delivery region, a start date and/or time, and/or the like. Information and/or attributes associated with a vehicle and included in a vehicle record may further include information associated with a party (e.g., a shipper, a purchaser, a seller, a buyer, and/or the like) in a vehicle transaction involving the vehicle such as a purchase order (PO) number, account information, an address, a shipping and/or delivery price, a segment price (e.g., a price of transporting a vehicle along a segment of a particular route, such as a segment between Baltimore and Philadelphia on a route from Atlanta to New York), a calculated score, and/or the like. Information and/or attributes of a vehicle included in a vehicle record may also include an amount of time that the vehicle has been in queue, progress, and/or staging in the multiple carrier dispatch optimization architecture.

Once generated, the vehicle record of the vehicle may be placed into a staging queue for verification at block 810. The vehicle record of the vehicle is typically selected and/or verified by the one or more user applications 810 and/or the inventory manager 820. In some embodiments, verifying the vehicle record of the vehicle includes determining information and/or attributes included in the vehicle record of the vehicle are valid based on a comparison of information and/or attributes included in the vehicle record of the vehicle and information and/or attributes stored in the archive database 840 (and/or other information disclosed herein). If information and/or attributes included in the vehicle record of the vehicle are determined to be invalid, the vehicle record (e.g., the vehicle) may be disqualified for inclusion in a vehicle inventory of the inventory manager 820 and therefore may be discarded at block 920. The vehicle record of the vehicle may also be disqualified at any time. Conversely, if information and/or attributes included in the vehicle record of the vehicle are determined to be valid, then the vehicle record of the vehicle is verified for inclusion in the vehicle inventory of the inventory manager 820.

Upon its verification, the vehicle record of the vehicle is transmitted to the inventory manager 820 for inclusion of the vehicle record of the vehicle in the vehicle inventory of the inventory manager 820 at block 930. From the vehicle inventory of the inventory manager 820, the vehicle record of the vehicle (e.g., the vehicle) may be assigned to a particular carrier in a variety of ways. Typically, assigning the vehicle to a carrier includes determining, based at least in part on an analysis and/or a comparison of information and/or attributes included in the vehicle record of the vehicle and/or carrier objectives and/or carrier constraints, that the vehicle can be transported by the carrier (e.g., that the carrier is enabled to safely transport the vehicle within defined constraints).

For example, the inventory manager 820 may directly assign the vehicle (e.g., the vehicle record of the vehicle) from the vehicle inventory of the inventory manager 820 to a carrier for transportation of the vehicle by the carrier. Typically, a vehicle is directly assigned to a carrier in response to the carrier selecting an optimized solution set (or one or more segments of a route, and/or the like) that includes the vehicle. As such, the vehicle is dispatched to the carrier for transportation of the vehicle by the carrier at block 940. In some embodiments, dispatching the vehicle to the carrier includes transmitting information and/or attributes included in the vehicle record of the vehicle to the carrier and/or the user by the one or more user applications 810, and/or the like.

As a second example, the vehicle may be assigned as a single segment (e.g., a single route from a pick-up location of the vehicle to a delivery location of the vehicle) by the inventory manager 820 to an online marketplace with which the system environment 800 is in communication. For example, at block 950, the online marketplace may include a listing and/or queue of available vehicles and/or vehicle segments from which multiple carriers may select for transportation. In some embodiments, the user may select a single vehicle (e.g., a single segment), multiple vehicles (e.g., multiple segments), an optimized solution set of vehicles (e.g., segments), and/or the like from the online marketplace listing. In this manner, multiple carriers may select multiple vehicles for transportation from the online marketplace according to carrier preferences such as a segment distance, segment location and/or region, price, and/or the like. If the vehicle is selected by a carrier from the listing, the vehicle is assigned by the inventory manager 820 to the carrier that selected the vehicle, and the vehicle is dispatched at block 940. If the vehicle is not selected for a predetermined period of time during which the vehicle is available, the vehicle may be removed from the listing of the online marketplace and be reintroduced and/or re-included into the vehicle inventory of the inventory manager 820.

As a third example, the inventory manager 820 may communicate with the optimizer 830 and/or transmit the vehicle record of the vehicle and/or information and/or attributes included in the vehicle record of the vehicle to the optimizer 830 for processing. In this manner and at block 960, the optimizer 830 is enabled to include, potentially, the vehicle record (e.g., the vehicle and/or information and/or attributes of the vehicle) in one or more optimized solution sets of carrier loads and/or carrier routes when determining the one or more optimized solution sets of carrier loads and/or carrier routes. The one or more optimized solution sets may be presented to the user and/or a carrier, who may accept or reject the one or more optimized solution sets, by the one or more user applications 810. If an optimized solution set that includes the vehicle is rejected, then the vehicle may be reintroduced and/or re-included into the vehicle inventory of the inventory manager 820 at block 930. In some embodiments, the user (e.g., a carrier) may select only a portion of an optimized solution set. For example, the user may select a first and a second segment of a suggested optimal route, while rejecting a third segment of the route. The third segment and associated vehicles may be reintroduced and/or re-included into the vehicle inventory of the inventory manager 820 (or traded with another carrier) at block 930. Conversely, if an optimized solution set that includes the vehicle is accepted, then, at block 840, the vehicle is dispatched to the user and/or carrier that selected the optimized solution set that includes the vehicle.

Typically, when the optimizer 830 includes the vehicle in one or more optimized solution sets at block 960, the vehicle's inclusion in the one or more optimized solution sets is exclusive. For example, once a vehicle included in a possible optimized solution set, the vehicle may not be included in another optimized solution set until the optimized solution set that includes the vehicle is rejected by the user and/or the carrier, in which case the vehicle and/or the vehicle record is reintroduced and/or re-included into the vehicle inventory of the inventory manager 820. Further, once a vehicle is selected by the user and/or a carrier from the listing of the online marketplace at block 950 and/or dispatched to a carrier at block 940, the vehicle cannot be selected by another user and/or another carrier. In this manner, the vehicle may not be mistakenly assigned to multiple users and/or carriers.

However, in some embodiments, one vehicle may be assigned to a plurality of optimized solution sets. To prevent duplicity in assigning the one vehicle to multiple carriers for transport, the one vehicle may be assigned to the carrier associated with a user who first selects an optimized solution set that includes the one vehicle. Accordingly, the optimizer 830 may monitor, track, compare, and/or store one or more time-stamps associated with each user's selection of each optimized solution set.

Figure 10:
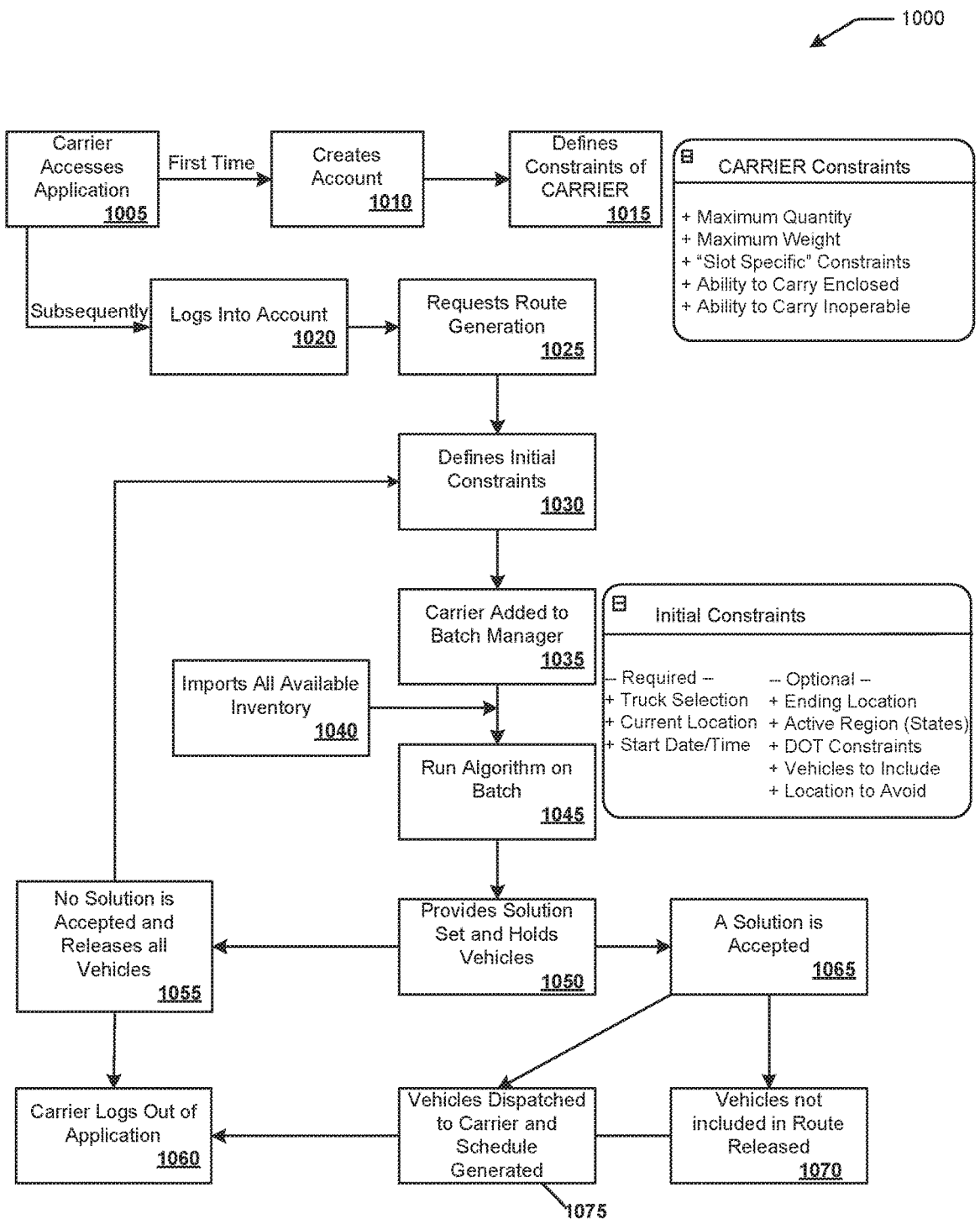
FIG. 10 is an example process flow diagram of an illustrative method for selecting an optimal vehicle shipment route, according to one embodiment of the disclosure.

FIG. 10 is an example process flow diagram illustrating details of an example method 300 for enabling a carrier to select an optimal vehicle shipment route, according to one embodiment of the disclosure. The diagram begins at block 1005 with the user (e.g., a carrier) accessing the one or more user applications 810. In some embodiments, the user may access the one or more user applications 810 using a smart phone, a tablet, a wearable device, a desktop computer, a laptop computer, a portable computing device, and/or the like.

Upon accessing the one or more user applications 810 for a first time, the user may be required and/or prompted by the one or more user applications 810 to create an account at block 310. Creating an account may, in some embodiments, include defining one or more carrier objectives and/or carrier constraints at block 1015 and/or as disclosed herein.

For subsequent accessing of the one or more user applications 810, the user, at block 320, logs into the created account. Once logged in, the user may be presented with a dashboard and/or landing page from which the user may select various actions and/or operations to be executed. For example, the user may enabled by the one or more user applications 810 to request a route generation at block 1025. For example, generating a request for route generation may include enabling the user to define initial constraints such as carrier objectives and/or constraints (e.g., a desired start and/or end location, a start date and/or time, and/or the like), information associated with the carrier, and/or the like. The request for route generation may be generated and/or received by the one or more user applications 810 and transmitted to the inventory manager 820 for processing. Route generation may further include generation of one or more vehicle segments, calculation of an estimated route travel time, an estimated cost of fuel for completing the generated route, and/or the like. The generated route and/or associated information may be transmitted to the user in a report, an email, a text message, a series of global positioning system (GPS) coordinates, and/or the like.

The inventory manager 820 may receive the request for route generation from the one or more user applications 810. Upon receipt of the request for route generation and at block 1035, the inventory manager 820 may add the carrier associated with the request for route generation to a batch manager. In some embodiments, the batch manager is a portion of the inventory manager 820 that is configured to coordinate aggregation of all vehicle records of vehicles that are available to be transported by multiple carriers. For example, at block 1040, an inventory of all vehicle records of vehicles that have been verified and placed in the inventory manager 820 may be imported by the batch manager.

Next, the imported vehicle records of vehicles may be transmitted from the inventory manager 820 to the optimizer 830 for processing. The optimizer 830, upon receiving the imported vehicle records of available vehicles may, at block 1045, identify one or more vehicle records of vehicles and/or segments of vehicles that are available for transport by the carrier using processes disclosed herein (e.g., an algorithm). For example, the optimizer 830 may identify one or more vehicle records of vehicles and/or segments of vehicles that are available for transport by the carrier based on the carrier objectives and/or carrier constraints defined by the user at blocks 1015 and/or 1030. Alternatively, the optimizer 830 may receive from the inventory manager 820 a listing including one or more vehicles that are available for inclusion in one or more optimized solution sets. Then, the optimizer 830 may, based on comparing and/or matching information and/or attributes associated with each available vehicle (e.g., information and/or attributes included in one or more vehicle records of the vehicles included in the listing of available vehicles) to carrier preferences (e.g., carrier objectives and/or carrier constraints) of a carrier, identify one or more vehicles that are eligible for inclusion in one or more optimized solution sets for the carrier (e.g., the carrier associated with the user). The optimizer 830 may then analyze and/or compare all eligible vehicles to identify one or more vehicles to be included an optimized solution set. For example, the optimizer 830 may determine one or more vehicles to be included in an optimized solution that minimizes a distance of an overall route for the carrier, that maximizes profit of the carrier, that minimizes an amount of fuel expenses for the carrier, that avoids particular hazards such as weather and/or construction, that minimizes a number of miles driven by the carrier loaded below a predetermined capacity, that minimizes a distance between one or more pick-ups and/or deliveries, that minimizes a time required by a carrier to load and/or unload one or more vehicles during one or more pick-ups and/or deliveries, that minimizes an amount of potential harm and/or damage when loading and/or unloading a carrier, and/or the like. In this manner, the optimizer 830 may generate one or more optimized solution sets using the identified one or more vehicle records of vehicles and/or segments of vehicles that are available for transport by the carrier. Again, the one or more optimized solution sets may include one or more vehicles, vehicle segments, and/or routes for transporting the one or more vehicles.

In some embodiments, each vehicle included in each of the one or more generated optimized solution sets is exclusive to the optimized solution set in which the vehicle is included. As such, at block 1050, the optimizer 830 and/or the inventory manager 830 may hold and/or remove each vehicle record of a vehicle that has been included in an optimized solution set from a list and/or an inventory of vehicle records of vehicles available to be transported by a carrier. In this manner, each vehicle may only be assigned to, allocated to, and/or included in one solution set presented to one carrier.

The optimizer 830 may transmit the one or more generated optimized solution sets to the inventory manager 820, which may update the inventory list and/or an inventory of vehicle records of vehicles available to be transported by a carrier based on the vehicles included in the one or more optimized solution sets. Further at block 1050, the one or more generated optimized solution sets may then be transmitted to the user application for presentation to the user and/or user selection.

If the user rejects and/or does not wish to select one or more of the one or more generated optimized solution sets and/or if an optimized solution set is not selected for a predetermined period of time, such as at block 1055, the one or more user applications 810, the inventory manager 820, and/or the optimizer 830 may release any exclusionary holds on vehicle records of vehicles included in unselected optimized solution sets, and the vehicle records of vehicles included in unselected optimized solution sets may be reintroduced and/or re-included in the inventory of vehicle records of vehicles that are available for transport by a carrier. Further, the user may be directed by the one or more user applications 810 to input new and/or modify existing initial constraints (e.g., carrier objectives and/or carrier constraints) at block 1030. In other embodiments and at block 1060, the user may be logged out of the user application 810.

The user may accept and/or select an optimized solution set (e.g., a suggested route including one or more vehicle transportation segments) at block 1065 and therefore accepts responsibility for transporting the vehicles included in the selected optimized solution set. At blocks 1065 and/or 1070, the user may further be enabled by the one or more user applications 810 to adjust and/or modify elements on the one or more generated optimized solution sets. For example, the user may delete one or more vehicles, route segments, and/or the like from an optimized solution set. In this manner, the user may further optimize their vehicle transportation route. Alternatively, the user may accept and/or select an optimized solution set without making any modifications to the optimized solution set. Again, the one or more user applications 810, the inventory manager 820, and/or the optimizer 830 may release any exclusionary holds on vehicle records of vehicles included in an optimized solution set that is de-selected, removed, deleted, and/or the like by the user, and the vehicle records of vehicles that were deleted from an optimized solution set may be reintroduced and/or re-included in the inventory of vehicle records of vehicles that are available for transport by a carrier.

Upon selection of an optimized solution set and at block 1075, the inventory manager 120 may assign each vehicle included in the selected optimized solution set to the carrier.

In some embodiments, assigning each vehicle included in the selected optimized solution set to the carrier includes dispatching each vehicle included in the selected optimized solution set to the carrier. Assigning each vehicle included in the selected optimized solution set to the carrier may further include assigning and/or correlating in the archival database 830 information and/or attributes of each vehicle included in the selected optimized solution set to carrier objectives and/or carrier constraints of the carrier and/or to information associated with the selected optimized solution set such as route information. Assigning each vehicle included in the selected optimized solution set to the carrier may also include generating a schedule and/or itinerary for the carrier detailing a route, carrier objectives and/or carrier constraints, information and/or attributes associated with each vehicle included in the selected optimized solution set, and/or the like.

Additionally, a contractual agreement may be generated by the one or more user applications 810, the inventory manager 820 in response to assigning each vehicle included in the selected optimized solution set to the carrier. In some embodiments, a user selection and/or acceptance of an optimized solution set may automatically enter the user and/or the carrier associated with the route generation request into a contractual agreement between the carrier and the shipper, the supplier, the buyer, the purchaser, the seller, and/or the like. The user may continue by logging out of the one or more user applications at block 1060.

In some embodiments, the optimizer 830 may be configured to minimize a number of carriers required to transport a set of vehicles when generating an optimized solution set. For example, the optimizer 830 may generate an optimized solution set based on attributes of one or more vehicles to be included in the optimized solution set, such as a vehicle weight, a vehicle size, a shipper fee, origin and/or destination locations, time windows for pick-up and/or delivery, and/or the like. Alternatively or additionally, the optimizer 830 may generate an optimized solution set based on attributes of one or more carriers (e.g., carrier objectives and/or carrier constraints) to transport the vehicles included in the optimized solution set, such as load capacity (e.g., a carrier volume and/or a carrier weight), pre-existing loads on the one or more carriers at various points during a route, a delivery schedule, delivery costs, a currently location, a desired destination location, and/or the like. In some embodiments, the optimizer 830 may utilize heuristic modeling (e.g., parallel processing) to generate one or more optimized solution sets simultaneously and/or in real time. For example, the optimizer 830 may generate a substantially large, representative number of possible optimized solution sets based on an available vehicle inventory, and then may intelligently search, sort, and/or the like through these representative solution sets to determine one or more optimized solution sets that maximize and/or minimize one or more particular variables (e.g., profit, distance, cost, time, location, vehicle information and/or attributes, carrier constraints and/or carrier objectives, and/or the like). The optimizer 830 may weight one or more variables when searching so as to more quickly and efficiently identify one or more preferred optimized solution sets.

The optimizer 830 may generate and/or assign individual vehicle pick-up and/or deliver segments into a set of routes. Each route of the set of routes may define a sequence of stops corresponding to the component segments (e.g., pick-up and/or delivery of a vehicle included in an optimized solution set of vehicles). In some embodiments, a route may include a one-way transport or a round-trip transport of one or more vehicles. Alternatively, a route may include a planned round-trip transport route of a carrier, where one or more vehicles are transported (e.g., delivered and/or picked up) at various locations along the planned carrier route. As routes and/or optimized solution sets are rejected and/or modified by the user, any vehicles and/or routes not selected by the user may be reintroduced and/or re-included in an inventory of vehicles available for transport. In this manner, the optimizer 830 may re-optimize one or more optimized solution sets based on modifications (e.g., removals, additions, and/or the like) of vehicles and/or segments of routes from the one or more optimized solution sets to therefore generate one or more new optimized solution sets which include an updated set of vehicles and/or route segments.

Additionally, some embodiments may include the optimizer 830 determining a route (e.g., a long route, a cross-country route, and/or the like) for transporting one or more vehicles included in an optimized solution set. The optimizer 830 may then determine one or more subroutes that may be assigned to different carriers. Further, wholesale auction facilities may be utilized as pick-up and/or delivery locations, staging locations, and/or the like. In this manner, segments of an optimized solution set may include picking up and/or delivering one or more vehicles to an auction facility so that the one or more vehicles may be more easily (e.g., more profitably) transported by multiple carriers.

In some embodiments, generating the one or more optimized solution sets by the optimizer 830 may include calculating a price of each route and/or a cost of transporting each vehicle included in the one or more optimized solution sets. In some embodiments, rate fluctuations based on current conditions such as weather, seasonal migrations, and/or the like may be included in pricing of each route and/or segment. Pricing of transporting a vehicle and/or a set of vehicles may be determined based at least in part on a vehicle price, a carrier type and/or inventory, weather, a driving record of the carrier, a driving history, a route history, a frequency of carrier travel along a particular route and/or to and/or from a particular location, preferred routes, insurance, a reliability and/or review score of the carrier, and/or the like. In some embodiments, an estimated cost, an estimated margin, and/or a projection of savings of selecting an optimized solution set may be determined and presented to the carrier with each optimized solution set of vehicles and/or route segments. For example, the optimizer 830 may determine a price of each segment (e.g., a price associated with transporting each vehicle) included in each optimized solution set and, based at least partially on the determined price of each segment, determine a total price of transporting all vehicles included in each optimized solution set. Alternatively, other factors may be considered by the optimizer 830 when determining a price, margin, and/or savings of each optimized solution set. Other factors may include weather information, fuel economy, carrier constraints and/or carrier objectives, vehicle information and/or attributes, and/or the like. In some embodiments, the optimizer 830 may utilize weights for various elements to determine pricing and/or generate one or more optimized solution sets. Additionally, the optimizer 830 may calculate pricing of transporting each individual vehicle and/or pricing of transporting multiple vehicles bundled in an optimized solution set.

In some embodiments, information (e.g., carrier objectives and/or carrier constraints, information and/or attributes associated with a vehicle, a vehicle record, and/or a vehicle transaction, weather information, pricing information and/or market information, route information and/or segment information, and/or the like) may be received in a continuous (e.g., real time) stream of data from a variety of sources. For example, weather information may be received from a plurality of weather information sources, and then may be processed by the system described herein to calculate an average temperature, calculate an estimated amount of precipitation, determine a level of hazard associated with weather conditions, calculate an estimated price and/or risk of transport based on weather conditions, and/or the like. Each piece of information may be weighted by the system described herein so as to account for factors that are most critical to pricing and/or safe transport of a vehicle. For example, in the winter, a segment including a route through the Northeast United States during a projected snow storm may be priced higher so that the carrier is rewarded for incurring substantially more risk than transporting a vehicle along a segment in the sunny Southeast United States. In this manner, more accurate estimates of cost, price, time, and/or the like may be calculated and provided to the carrier, and each estimate and/or calculation may be updated in real time as information is received and processed by the system.

Further, generating the one or more optimized solution sets by the optimizer 830 may include determining a minimum number of carriers required to transport one or more vehicles to be included in a generated optimized solution set on which the generation is based. Generating the one or more optimized solution sets by the optimizer 830 may also include determining a maximum amount of revenue and/or efficiency for a carrier and/or a dispatcher on which the generation is based.

In some embodiments, the optimizer 830 may determine a route is optimal based on geometries of loads (e.g., vehicles) to be transported by the carrier and/or road hazards (e.g., weather conditions, road types, and/or the like). In other embodiments, the optimizer 830 may determine an optimal loading of vehicles onto a carrier based on vehicle size, shape, type, safety, convenience and/or speed of loading and/or unloading vehicles onto the carrier, and/or the like. For example, it may be determined to be optimal to load a first vehicle onto a first portion of a carrier and to load a second vehicle onto a second portion of the carrier. Alternatively or additionally, the optimizer 830 may determine an optimal route that minimizes a number of miles traveled by a carrier with a less-than-capacity load.

In some embodiments, it may be unprofitable for a carrier to transport a first vehicle from its current location to its destination location. However, by optimally grouping and/or bundling the first vehicle with one or more other vehicles to be transported, transporting the first vehicle may become profitable. In this manner, a potentially unprofitable vehicle transport segment (e.g., an outlier) may be included with one or more profitable vehicle transport segments in an optimized solution set, and the optimized solution set may still be profitable (e.g., an average of the profit associated with the outlier and the one or more profitable segments is greater than zero).

In some embodiments, multi-modal optimization architectures may be utilized by the optimizer 830. Utilizing multi-modal optimal architectures may include utilizing multiple modes of transportation for optimally transporting one or vehicles. For example, the optimizer 830 may determine that an optimal method of transporting a vehicle includes a first carrier (e.g., Truck 1) picking up the vehicle at a pick-up location and transporting the vehicle to a first train depot, where the vehicle may be loaded onto a railcar of a train for transport to a second train depot. The train may transport the vehicle to the second train depot, where a second carrier picks up the vehicle. The second carrier then may transport the vehicle to a destination location. In this manner, the optimizer 830 may utilize multiple transportation modes when determining an optimal route, solution set, and/or the like.

In some embodiments, any type of surface transportation (e.g., railcars, railways, trains, trams, sleds, and/or the like), naval and/or aquatic vehicles, aircraft, and/or the like may be utilized by the optimizer in multi-modal optimization architectures. Utilizing different modes of transportation may be more optimal than utilizing a singular mode of transportation because each different mode of transportation may have different schedules, travel times, routes, and/or the like that better minimize and/or maximize one or more variables in the optimization architectures. For example, utilizing a railcar to transport a vehicle may be more efficient for a carrier to transport the vehicle because utilizing the railcar may minimize a number of miles traveled by the carrier, or by avoiding delays caused by additional shorter vehicle transports that may be required to make the long-haul transport economical to the carrier. Additionally, carriers of different modes of transportation may have different carrier configurations (e.g., a railcar is larger than a tractor trailer). Alternatively, if a destination location is on an island or other difficult-to-reach, isolated, and/or remote environment, utilizing multiple modes of transportation may be necessary. In some embodiments, multi-modal optimization architecture utilization may be a selectable option presented to the user (e.g., carrier) for selection.

Figure 11:
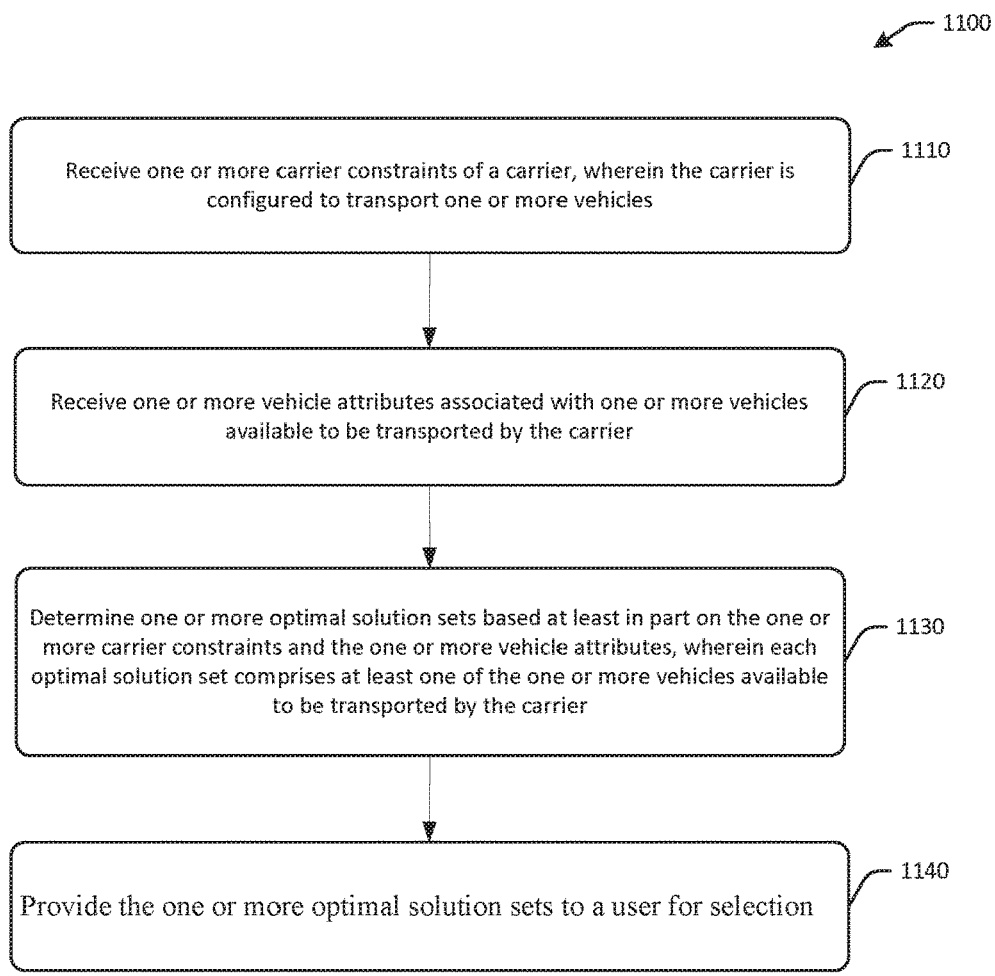
FIG. 11 is a flow diagram illustrating of an illustrative method for optimizing one or more carrier routes for picking up and/or delivering multiple vehicles, according to one embodiment of the disclosure.

FIG. 11 is a flow diagram illustrating details of an example method 1110 for optimizing one or more carrier routes for picking up and/or delivering multiple vehicles, according to one embodiment of the disclosure. At block 1110, the method 1100 can include receiving one or more carrier constraints of a carrier, wherein the carrier is configured to transport one or more vehicles. At block 1120, the method 1100 can include receiving one or more vehicle attributes associated with one or more vehicles available to be transported by the carrier. At block 1130, the method 1100 can include determining one or more optimal solution sets based at least in part on the one or more carrier constraints and the one or more vehicle attributes, wherein each optimal solution set comprises at least one of the one or more vehicles available to be transported by the carrier. At block 1140, the method 1100 can include providing the one or more optimal solution sets to a user for selection.

Example embodiments of the disclosure provide a number of technical features, technical benefits, and technical effects. For example, in accordance with example embodiments of the disclosure, multiple processor (e.g., GPU) threads may be utilized to determine, in parallel, solutions to an optimization problem within an assigned solution space, thereby reducing the processing time and processing load required to obtain a timely, high-quality solution to the optimization. In addition, in accordance with example embodiments of the disclosure, group theoretic techniques are used to model an optimization problem and fragment a solution space into partitions that can be processed by respective processing threads, thereby providing an approach that allows elite solutions to be identified more efficiently, ultimately leading to determination of a timely, high-quality solution with less processing time. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Device Architecture

Figure 12:
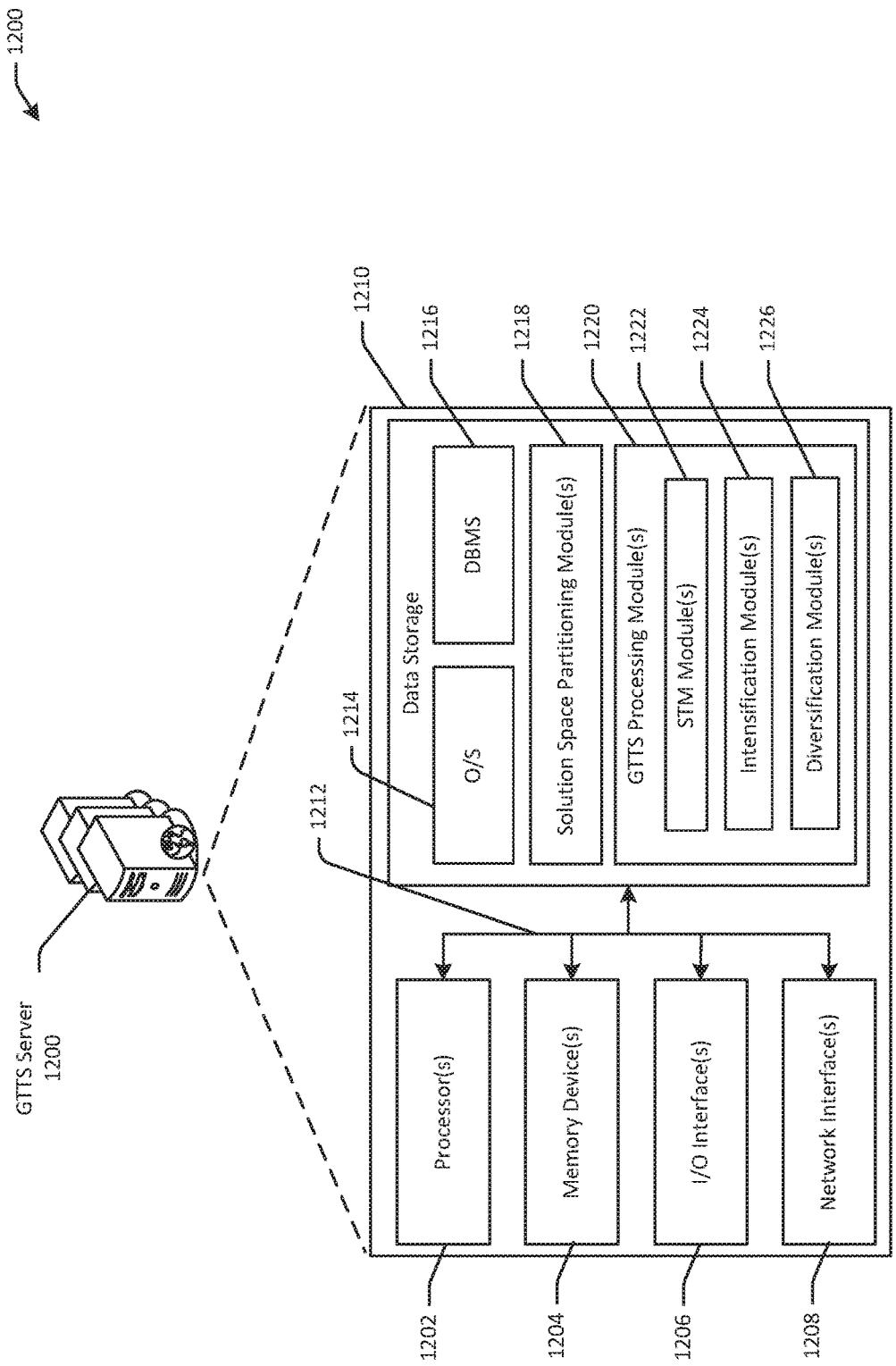
FIG. 12 is a schematic block diagram of an illustrative server configured to execute GTTS processing in accordance with one or more example embodiments of the disclosure.

FIG. 12 is a schematic block diagram of an illustrative server configured to execute GTTS processing in accordance with one or more example embodiments of the disclosure. In an illustrative configuration, the GTTS server 1200 may include one or more processors (processor(s)) 1202, one or more memory devices 1204 (generically referred to herein as memory 1004), one or more input/output ("I/O") interface(s) 1206, one or more network interfaces 1208, and data storage 1210. The device 1200 may further include one or more buses 1212 that functionally couple various components of the device 1200. These various components will be described in more detail hereinafter.

The bus(es) 1212 may include at least one of a system bus, a memory bus, an address bus, or a message bus, and may permit exchange of information (e.g., data (including computer-executable code), signaling, etc.) between various components of the device 1200. The bus(es) 1212 may include, without limitation, a memory bus or a memory controller, a peripheral bus, an accelerated graphics port, and so forth. The bus(es) 1212 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1204 of the device 1200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1210 may include removable storage and/or non-removable storage including, but not limited to, magnetic storage, optical disk storage, solid-state storage, and/or tape storage. The data storage 1210 may provide non-volatile storage of computer-executable instructions and other data. The memory 1204 and the data storage 1210, removable and/or non-removable, are examples of computer-readable storage media (CRSM) as that term is used herein.

The data storage 1210 may store computer-executable code, instructions, or the like that may be loadable into the memory 1204 and executable by the processor(s) 1202 to cause the processor(s) 1202 to perform or initiate various operations. The data storage 1214 may additionally store data that may be copied to memory 1204 for use by the processor(s) 1202 during the execution of the computer-executable instructions. Moreover, output data generated as a result of execution of the computer-executable instructions by the processor(s) 1202 may be stored initially in memory 1204, and may ultimately be copied to data storage 1210 for non-volatile storage.

More specifically, the data storage 1210 may store one or more operating systems (O/S) 1214; one or more database management systems (DBMS) 1216; and one or more program modules, applications, or the like such as, for example, one or more solution space partitioning modules 1218 and one or more GTTS processing modules 1220. The GTTS processing modules 1220 may further include one or more sub-modules such as, for example, one or more STM modules 1222, one or more intensification modules 1224, and one or more diversification modules 1226.

The solution space partitioning module(s) 1218 may include computer-executable instructions, code, or the like that when executed by one or more of the processor(s) 1202 causes operations to be performed for fragmenting a solution space to generate solution space partitions that can be processed by the GTTS processing module(s) 1220. In certain example embodiments, the GTTS processing module(s) 1220 may include computer-executable instructions, code, or the like that are executed on executed on each GPU thread 128(1)-128(N) to cause each GPU thread to explore a respective solution space partition for elite solutions to an optimization problem. The STM module(s) 1222 may include computer-executable instructions, code, or the like that when executed by one or more of the processor(s) 1202 causes operations to be performed for executing an STM phase of tabu search. The STM phase may include exploration of a diversification cell (e.g., a solution space fragment) to determine elite solution(s). The intensification module(s) 1224 may include computer-executable instructions, code, or the like that when executed by one or more of the processor(s) 1202 may cause operations to be performed for executing an intensification phase of tabu search. For example, when an STM phase fails to produce any additional elite solution, the GTTS processing module(s) 1218 may return to the most elite solution determined thus far and may utilize the intensification module(s) 1224 to initiate an intensification phase in connection with the most elite solution. For example, the intensification phase may include initiating a new STM phase in connection with the most elite solution. The diversification module(s) 1226 may include computer-executable instructions, code, or the like that when executed by one or more of the processor(s) 1202 causes operations to be performed for diversifying GTTS processing to a new diversification cell.

The data storage 1210 may further store any of variety of other types of modules. Further, any program modules stored in the data storage 1210 may include one or more sub-modules. Further, any data stored in the data storage 1210 may be loaded into the memory 1204 for use by the processor(s) 1202 in executing computer-executable code.

In addition, any data potentially stored in one or more datastores may be accessed via the DBMS 1216 and loaded in the memory 1204 for use by the processor(s) 1202 in executing computer-executable code.

The processor(s) 1202 may be configured to access the memory 1204 and execute computer-executable instructions loaded therein. For example, the processor(s) 1202 may be configured to execute computer-executable instructions of the various program modules of the server 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit (e.g., CPU 102), a graphical processing unit (e.g., GPU 104), a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to other illustrative components depicted as being stored in the data storage 1210, the O/S 1214 may be loaded from the data storage 1210 into the memory 1204 and may provide an interface between other application software executing on the server 1200 and hardware resources of the server 1200. More specifically, the O/S 1214 may include a set of computer-executable instructions for managing hardware resources of the server 1200 and for providing common services to other application programs (e.g., managing memory allocation among various application programs). The O/S 1214 may include any operating system now known or which may be developed in the future including, but not limited to, any server operating system, any mainframe operating system, or any other proprietary or non-proprietary operating system.

The DBMS 1216 may be loaded into the memory 1204 and may support functionality for accessing, retrieving, storing, and/or manipulating data stored in the memory 1204, data stored in the data storage 1210, and/or data stored in one or more datastores (e.g., the archival datastore(s) 120). The DBMS 1216 may use any of a variety of database models (e.g., relational model, object model, etc.) and may support any of a variety of query languages. The DBMS 1216 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the server 1200 is a mobile device, the DBMS 1216 may be any suitable light-weight DBMS optimized for performance on a mobile device. It should be appreciated that "data," as that term is used herein, may include computer-executable instructions, code, or the like.

Referring now to other illustrative components of the server 1200, the one or more input/output (I/O) interfaces 1206 may facilitate the receipt of input information by the device 1000 from one or more I/O devices as well as the output of information from the server 1200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 1200 or may be separate. The I/O devices may further include, for example, any number of peripheral devices such as data storage devices, printing devices, and so forth.

The I/O interface(s) 1206 may also include an interface for an external peripheral device connection such as universal serial bus (USB), FireWire, Thunderbolt, Ethernet port or other connection protocol that may connect to one or more networks. The I/O interface(s) 1206 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 1200 may further include one or more network interfaces 1208 via which the server 1200 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules, applications, computer-executable instructions, code, or the like depicted in FIG. 12 as being stored in the data storage 1210 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 1200, and/or hosted on other computing device(s) accessible via one or more networks, may be provided to support functionality provided by the program modules, applications, or computer-executable code depicted in FIG. 12 and/or additional or alternate functionality. Further, functionality may be modularized differently such that processing described as being supported collectively by the collection of program modules depicted in FIG. 12 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 12 may be implemented, at least partially, in hardware and/or firmware across any number of devices.

It should further be appreciated that the server 1200 may include alternate and/or additional hardware, software, or firmware components beyond those described or depicted without departing from the scope of the disclosure. More particularly, it should be appreciated that software, firmware, or hardware components depicted as forming part of the server 1200 are merely illustrative and that some components may not be present or additional components may be provided in various embodiments. While various illustrative program modules have been depicted and described as software modules stored in data storage 1210, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 600-700 may be performed by one or more components of the server 1200, or more specifically, by one or more one or more program modules executing on such a server 1200. It should be appreciated, however, that any of the operations of methods 600-700 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the methods 600-700 may be described in the context of the illustrative server 1200, it should be appreciated that such operations may be implemented in connection with numerous other system configurations.

The operations described and depicted in the illustrative methods of FIG. 6-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 6-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system, comprising:
   a central processing unit (CPU);
   a graphical processing unit (GPU) comprising a plurality of arithmetic logic units (ALUs);
   at least one memory storing computer-executable instructions; and
   one or more buses that operatively couple the CPU, the GPU, and the at least one memory,
   wherein the CPU is configured to access the at least one memory via at least one bus of the one or more buses and execute the computer-executable instructions to:
      receive one or more vehicle attributes associated with one or more vehicles available to be transported by one or more carriers;
      determine a solution space for an optimization problem associated with transportation of the one or more vehicles, wherein at least a portion of the solution space is represented by a first matrix;
      determine, based on Group Theoretic Tabu Search (GTTS) processing, an initial solution to the optimization problem within a first cell of the solution space and an initial fragmentation of the solution space;
      fragment the initial fragmentation into a proper subgroup of the initial fragmentation, wherein the proper subgroup comprises into a plurality of cells, wherein each cell comprises a respective disjoint subset of the solution space, wherein the plurality of cells are determined using negative arcs corresponding to negative entries in a second matrix, wherein the second matrix is determined by subtracting the initial solution from one or more rows of the first matrix;
      cause the GPU to launch a respective GPU thread to perform GTTS processing on a corresponding cell of the plurality of cells, wherein each respective GPU thread utilizes a corresponding ALU of the plurality of ALUs to process the corresponding cell to determine a respective solution to the optimization problem;
determine one or more optimal solution sets; and
send the one or more optimal solution sets to a user device for selection via an online marketplace over a network.

2. The system of claim 1, wherein the CPU is further configured to execute the computer-executable instructions to:
launch a plurality of kernels on the at least one memory, wherein each kernel is associated with a corresponding respective GPU thread.

3. The system of claim 1, wherein the plurality of cells is a first plurality of cells, and wherein the CPU is further configured to execute the computer-executable instructions to:
fragment the solution space into a second plurality of cells that is different from the first plurality of cells based at least in part on the respective solution to the optimization problem determined by each respective GPU thread.

4. The system of claim 1, wherein the CPU is further configured to execute the computer-executable instructions to:
receive one or more carrier constraints of a carrier, wherein the carrier is configured to transport one or more vehicles;
receive one or more vehicle attributes associated with one or more vehicles available to be transported by the carrier;
determine one or more optimal solution sets based at least in part on the one or more carrier constraints and the one or more vehicle attributes based at least in part on the processing of the plurality of cells; and
provide the one or more optimal solution sets to a user device.

5. The system of claim 4, wherein the CPU is further configured to execute the computer-executable instructions to:
receive from a user device a modification to the optimal solution, wherein modification comprises at least one of adding, deleting, accepting, trading, swapping, rejecting, and modifying at least one of the one or more vehicles comprised in the one or more optimal solution sets.

6. The system of claim 4, wherein each of the one or more vehicles available to be transported by the carrier is associated with an optimized route segment for transporting each respective vehicle from a pick-up location to a delivery location.

7. The system of claim 4, wherein the CPU is further configured to execute the computer-executable instructions to:
assign a selected optimal solution set to the carrier;
generate a schedule for the carrier to transport each vehicle included in the selected optimal solution set; and
provide instructions for dispatching each vehicle included in the selected optimal solution set to be transported by the carrier according to the schedule.

8. The system of claim 4, wherein the one or more optimal solution sets are provided to a user device for selection via an online marketplace listing over a wireless network.

9. The system of claim 1, wherein causing the GPU to launch a respective GPU thread to perform GTTS processing on a corresponding cell of the plurality of cells further comprises using a cross-cell transversal, wherein the cross-cell transversal comprises:
perform GTTS processing on a first cell of the plurality of cells;
perform GTTS processing on a second cell of the plurality of cells;
index the first cell and the second cell;
determine that a transversal value is less than a threshold value; and
store, based on the determination that the transversal value is less than the threshold value, data indicating the GTTS processing of the first cell and the second cell, wherein the data provides an indication that the first cell and second cell have been processed to prevent cycling of the first cell and second cell in subsequent GTTS processing.

10. A non-transitory computer-readable medium storing computer-executable instructions, that when executed by at least one processor, cause the at least one processor to:
receive one or more vehicle attributes associated with one or more vehicles available to be transported by one or more carriers;
determine a solution space for an optimization problem associated with transportation of the one or more vehicles, wherein at least a portion of the solution space is represented by a first matrix;
determine, based on Group Theoretic Tabu Search (GTTS) processing, an initial solution to the optimization problem within a first cell and an initial fragmentation of the solution space;
fragment the initial fragmentation into a proper subgroup of the initial fragmentation, wherein the proper subgroup comprises a plurality of cells, wherein each cell comprises a respective disjoint subset of the solution space, wherein the plurality of cells are determined using negative arcs corresponding to negative entries in a second matrix, wherein the second matrix is determined by subtracting the initial solution from one or more rows of the first matrix;
cause a GPU to launch a respective GPU thread to perform GTTS processing on a corresponding cell of the plurality of cells, wherein each respective GPU thread utilizes a corresponding arithmetic logic unit (ALU) of a plurality of ALUs of the GPU to process the corresponding cell to determine a respective solution to the optimization problem;
determine one or more optimal solution sets; and
send the one or more optimal solution sets to a user device for selection via an online marketplace over a network.

11. The non-transitory computer-readable medium of claim 10, wherein computer-executable instructions further cause the at least one processor to:
launch a plurality of kernels, wherein each kernel is associated with a corresponding respective GPU thread.

12. The non-transitory computer-readable medium of claim 10, wherein the plurality of cells is a first plurality of cells, and wherein computer-executable instructions further cause the at least one processor to:
fragment the solution space into a second plurality of cells that is different from the first plurality of cells based at least in part on the respective solution to the optimization problem determined by each respective GPU thread.

13. The non-transitory computer-readable medium of claim 10, wherein computer-executable instructions further cause the at least one processor to:
  receive one or more carrier constraints of a carrier, wherein the carrier is configured to transport one or more vehicles;
  determine one or more optimal solution sets based at least in part on the one or more carrier constraints and the one or more vehicle attributes based at least in part on the processing of the plurality of cells; and
  provide the one or more optimal solution sets to a user device.

14. The non-transitory computer-readable medium of claim 13, wherein computer-executable instructions further cause the at least one processor to:
  receive from a user device a modification to the optimal solution, wherein modification comprises at least one of adding, deleting, accepting, trading, swapping, rejecting, and modifying at least one of the one or more vehicles comprised in the one or more optimal solution sets.

15. The non-transitory computer-readable medium of claim 13, wherein each of the one or more vehicles available to be transported by the carrier is associated with an optimized route segment for transporting each respective vehicle from a pick-up location to a delivery location.

16. The non-transitory computer-readable medium of claim 13, wherein computer-executable instructions further cause the at least one processor to:
  assign a selected optimal solution set to the carrier;
  generate a schedule for the carrier to transport each vehicle included in the selected optimal solution set; and
  provide instructions for dispatching each vehicle included in the selected optimal solution set to be transported by the carrier according to the schedule.

17. A method comprising:
  receiving one or more vehicle attributes associated with one or more vehicles available to be transported by one or more carriers;
  determining a solution space for an optimization problem associated with transportation of the one or more vehicles, wherein at least a portion of the solution space is represented by a first matrix;
  determining, based on Group Theoretic Tabu Search (GTTS) processing, an initial solution to the optimization problem within a first cell and an initial fragmentation of the solution space;
  fragmenting the initial fragmentation into a proper subgroup of the initial fragmentation, wherein the proper subgroup comprises a plurality of cells, wherein each cell comprises a respective disjoint subset of the solution space, wherein the plurality of cells are determined using negative arcs corresponding to negative entries in a second matrix, wherein the second matrix is determined by subtracting the initial solution from one or more rows of the first matrix;
  causing a GPU to launch a respective GPU thread to perform GTTS processing on a corresponding cell of the plurality of cells, wherein each respective GPU thread utilizes a corresponding arithmetic logic unit (ALU) of a plurality of ALUs of the GPU to process the corresponding cell to determine a respective solution to the optimization problem;
  determining one or more optimal solution sets; and
  sending the one or more optimal solution sets to a user device for selection via an online marketplace over a network.

* * * * *